(12) United States Patent
Strand et al.

(10) Patent No.: US 10,417,634 B1
(45) Date of Patent: Sep. 17, 2019

(54) ON-LINE TRANSACTION VERIFICATION SERVICE AND APPARATUS

(71) Applicant: Amazon Technologies, Inc., Reno, NV (US)

(72) Inventors: William Alexander Strand, Issaquah, WA (US); Luan Khai Nguyen, Auburn, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1015 days.

(21) Appl. No.: 14/473,433

(22) Filed: Aug. 29, 2014

(51) Int. Cl.
*G06Q 20/38* (2012.01)

(52) U.S. Cl.
CPC ............................... *G06Q 20/3829* (2013.01)

(58) Field of Classification Search
CPC .................................................. G06Q 20/3829
See application file for complete search history.

(56) References Cited

U.S. PATENT DOCUMENTS

| | | | | |
|---|---|---|---|---|
| 7,006,993 B1* | 2/2006 | Cheong | ................... | G06Q 20/02 705/35 |
| 7,240,192 B1* | 7/2007 | Paya | ................... | H04L 63/0807 713/152 |
| 7,272,723 B1* | 9/2007 | Abbott | ................... | G06F 21/00 709/223 |
| 8,545,335 B2* | 10/2013 | Fiegener | ................... | A63H 3/28 446/175 |
| 8,591,343 B2* | 11/2013 | Walker | ................... | A63F 13/00 235/380 |
| 9,467,293 B1* | 10/2016 | Brainard | ............ | G06Q 20/3823 |
| 9,721,082 B2* | 8/2017 | Fujioka | ................... | G06Q 20/40 |
| 2002/0123938 A1* | 9/2002 | Yu | ......................... | G06Q 30/06 705/26.43 |
| 2003/0101134 A1* | 5/2003 | Liu | ........................ | G06Q 20/04 705/39 |
| 2003/0163711 A1* | 8/2003 | Grawrock | ............... | G06F 21/57 713/189 |
| 2004/0243824 A1* | 12/2004 | Jones | ...................... | G06F 21/10 726/1 |
| 2005/0130745 A1* | 6/2005 | Dernis | ................... | A63F 13/10 463/43 |
| 2006/0004771 A1* | 1/2006 | Enenkiel | ............ | H04L 63/0823 |

(Continued)

*Primary Examiner* — Jacob C. Coppola
(74) *Attorney, Agent, or Firm* — Thomas | Horstemeyer, LLP

(57) ABSTRACT

Methods, devices and program products are provided to provide on-line transaction verification. The method comprises receiving a transaction request and sending a transaction verification request to a computing device and/or account associated with a user. The method receives an electronic key authorization (EKA) code from a transaction verification apparatus. The EKA code is inaccessible when first and second housing portions of the apparatus are dis-connected from one another. The method determines whether the EKA code matches an account authorization code. A match indicates approval of the transaction. The transaction verification apparatus comprises a housing separated into first and second housing portions that are physically connectable to, and dis-connectable from, one another. The EKA code is only readable by the computing device from the transaction verification apparatus when first and second housing portions are connected to one another.

20 Claims, 11 Drawing Sheets

(56) References Cited

U.S. PATENT DOCUMENTS

| | | | | |
|---|---|---|---|---|
| 2006/0059572 | A1* | 3/2006 | Shoemaker | G06F 21/10 726/29 |
| 2006/0107037 | A1* | 5/2006 | Lincoln | G06Q 20/40 713/155 |
| 2006/0287110 | A1* | 12/2006 | Klitsner | A63F 13/10 463/44 |
| 2007/0180100 | A1* | 8/2007 | Biggs | G06F 21/554 709/224 |
| 2007/0214473 | A1* | 9/2007 | Barton | G11B 27/105 725/28 |
| 2007/0244824 | A1* | 10/2007 | Motley | G06F 21/123 705/59 |
| 2008/0015015 | A1* | 1/2008 | Walker | A63F 13/00 463/29 |
| 2008/0086770 | A1* | 4/2008 | Kulkarni | H04L 63/0876 726/20 |
| 2009/0171805 | A1* | 7/2009 | Gould | G06Q 20/40 705/26.1 |
| 2009/0215431 | A1* | 8/2009 | Koraichi | G06Q 20/32 726/4 |
| 2014/0331294 | A1* | 11/2014 | Ramallo | G06F 21/6245 726/5 |
| 2014/0358780 | A1* | 12/2014 | Fujioka | G06Q 20/40 726/19 |

* cited by examiner

ON-LINE TRANSACTION VERIFICATION SERVICE AND APPARATUS

BACKGROUND

Various Internet-based applications and services are offered that afford individuals easy access to products and services. Individuals can buy virtually any product or service over the Internet, including a wide variety of applications and content. While some products and services are free, others are purchased. To facilitate on-line transactions, most individuals set up one or more user accounts that include the basic user account information requested in most purchases. The user account information also includes financial information such as a credit card number of other funding source to pay for products and services.

Today, younger and younger users are accessing the Internet and on-line services to obtain products and services. For example, children can go on-line to download numerous various products, such as games, videos, movies, songs and other content. Children typically know their parent's user account ID and password, and thus are able to complete on-line transactions without any parent supervision or even knowledge of the transaction.

However, parents do not always agree with their children's on-line transactions. For example, a parent may not want their young child to buy songs or movies with adult or explicit language. As another example, parents may not want their children to download numerous games onto their parent's phone.

A similar problem exists with other groups in addition to the class of individuals in a parent-child relationship. For example, in businesses, educational institutes or medical institutes, there are groups who may warrant supervision of purchasing/downloading decisions. Examples of groups that warrant supervision of purchasing/downloading decisions include groups in a doctor-staff relationship, manager-employee relationship or teacher-student relationship.

A need remains for ways to make on-line purchasing experiences by children, staff, employees, students and the like safer (or more generally acceptable to parents, doctors, managers, teaches and the like).

BRIEF DESCRIPTION OF THE DRAWINGS

FIG. 4A is a server-side perspective and FIG. 4B is a client-side perspective.

DETAILED DESCRIPTION

Figure 1:
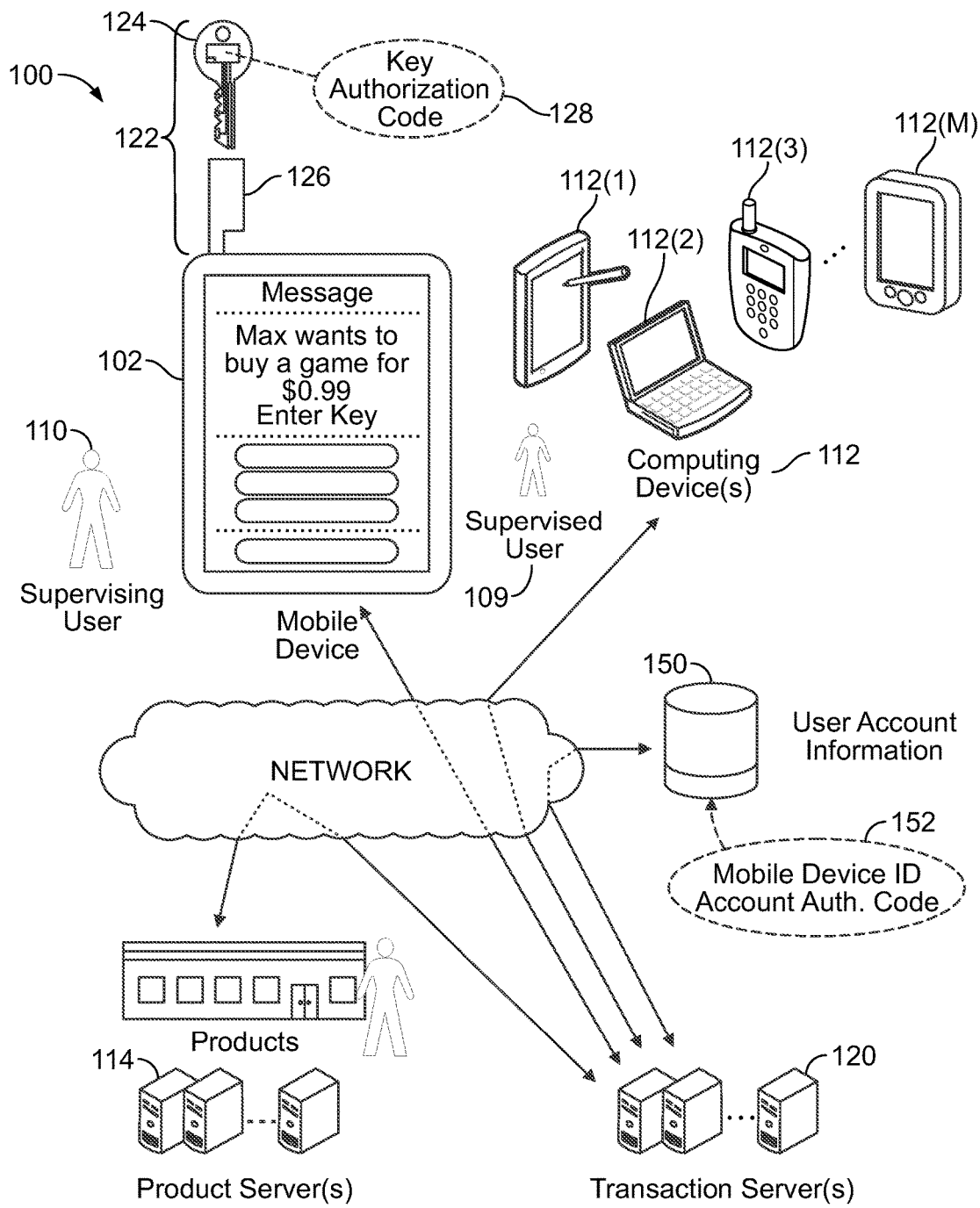
FIG. 1 illustrates a system for providing an on-line transaction experience that is safe for individuals who should be supervised in accordance with embodiments herein.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Systems and methods in accordance with various embodiments herein provide the ability to facilitate a transaction, such as a purchasing experience, that is safe for individuals who have been designated to need supervision when making purchasing decisions. For example, the purchasing experience may be by a child, adolescent or individual whose purchase decisions may warrant supervision, or who have been designated by some authority as needing supervision Prior to completing a transaction a supervised user, such as a child, connects a transaction verification apparatus to a device being used to perform the transaction (e.g., the child's device, a parent's device, a media player, etc.) so that the system can confirm that the supervised user is authorized by a supervising user, such as a parent, to perform the transaction. The transaction verification apparatus can be built with a housing having two pieces that are assembled before the transaction verification apparatus is connected to device being used to perform the transaction. For example, the transaction verification apparatus may be a two-piece key, one half of which is kept by the child and the other half of which is kept by the parent. When the parent decides to permit the child to order, download or otherwise complete a transaction, the parent can give the child the parent's half of the key. The child then assembles the two pieces of the key, and connects the key to the device being used to perform the transaction to inform the system that the transaction is authorized by the parent. Use of the transaction verification apparatus enables a parent to maintain control over transactions performed by children without requiring the parent to be directly involved in each transaction.

FIG. 1 provides a more detailed illustration of a system to facilitate transactions in accordance with embodiments herein. The system includes one or more computing devices 112(1)-112(M), a mobile device 102, one or more transaction servers 120, one or more product servers 114 and one or more user accounts 150. Non-limiting examples of computing devices 112(1)-112(M) include tablet computers, mobile phones, personal digital assistance, laptop/desktop computers and the like. Supervised users 109 may use computing devices 112(1)-112(M) of their parents, their friends, and their own, as well as public computing devices (e.g., at school, libraries, cafes, etc.) to access websites and online services.

Supervised users, such as children, adolescents, patients, employees, students and other individuals who warrant supervision (herein collectively "supervised users"), have access to content via networks, such as the Internet. The supervised users 109 may access various online services to buy or obtain products and/or services, downloadable applications, movies, music and a variety of other content, including but not limited to traditional physical goods and services (e.g. products and services at online retailers), collectively referred to as an item(s) or item(s) of interest. The terms "item", "items", "select item", "select items", "item of interest" and "items of interest" are used broadly to generally refer to any type of product, service, content, application or otherwise that can be ordered on-line, physically shipped to an address and/or downloaded to a computing device. The item of interest may be for sale, lease, lending or may be free. Non-limiting examples of items include music, movies, videos, programs, e-books, e-magazines, e-publications, Internet browser sessions, etc. The item of interest may be provided permanently or temporarily to the supervised user. For example, a temporary service may represent an network session in which a supervised user opens or uses a browser to access content via the network, a supervised user opens or uses an application on a computing device to access local content on the computing device, a supervised user turns on a smart television to access Internet-based or over-the-air or local content on the television, and/or a supervised user watches/listens to content over the Internet (e.g. video clips, movies, songs, etc.), plays games online through an active Internet session, and the like. For example, children, employees and other supervised users may use a browser or application to read, search for various content, play games, watch video, listen to music and the like, all of which represent items of interest, all of which are selected by a supervised user.

The term "transaction" as used throughout includes, but is not limited to, acquisition related transactions, such as buying or renting, obtaining for free, and/or downloading products, applications, content, services or other items. The term transaction also includes network-resource related transactions, such as initiating a browser session, software application or other computer-based session to access resources over a network (e.g. to play games online, watch movies, watch shows, watch video clips, play music, navigate between resources accessible via the Internet, read online, etc.). The term transaction also includes home entertainment device related transactions, such as activating a television, home entertainment system, and the like to access network-based content or over the air or local content. The term transaction also includes local computer related transactions, such as activating a software application on a local computer and the like, to play games, to perform homework, to perform office work related to secure projects that warrant extra security and the like.

When a supervised user 109 uses a computing device 102, 112 to access a network and identify products/services of interest, it is desirable to afford a controlled environment in which it is acceptable to act upon a supervised user's decisions to purchase, download or otherwise order products, services or other items of interest. Parents generally do not want their children to have the unlimited ability to go onto a parent's on-line account and buy large amounts of goods and services by simply entering a few or even one click of a mouse. As another example, parents and office managers do not want children and employees to spend unlimited amounts of time accessing network-based content for leisure reasons. The system 100 adds a verification process to each transaction to afford supervising users, such as parents, guardians, managers, doctors, teachers, professors, businesses, entities, and other on-line account owners, an opportunity to manage transactions. To simplify the verification process, the supervising users 110 utilize an electronic transaction verification apparatus 122 that is plugged into a computing device 102 (also interchangeably referred to as a mobile device 102 herein), before a supervised user can complete a transaction. While parents want to limit their children's ability to buy products/services, spend time on the Internet, download games and the like, the parents do not want to be prompted every time their child wants to buy a song or download a game. To simplify the verification process, the transaction verification apparatus 122 is formed in at least two pieces. The transaction verification apparatus 122, by way of example, may represent a dongle or a physical key. The supervising user 110 may keep one piece of the apparatus 122, while the child may keep another piece of the apparatus 122. Before a child can complete a transaction, the child asks their parent for the parent's piece of the apparatus 122, assembles the pieces of the apparatus 122 together and plugs the apparatus 122 into mobile device 102. The apparatus 122 stores an electronic key verification (EKA) code 128 that is read by the mobile phone or other computing device 102. The mobile device or other computing device cannot read the EKA code 128 until the pieces of the apparatus 122 are connected together. The mobile device conveys the EKA code 128 over the Internet to one or more servers or computing devices 120 that is involved in at least some aspect of the transaction (referred to herein as a "transaction server").

Next, select actions of the supervised user 109, the transaction server 120, and the supervising user 110 are described in connection with FIG. 2 for a transaction, while the remaining components of FIG. 1 are described thereafter.

Figure 2:
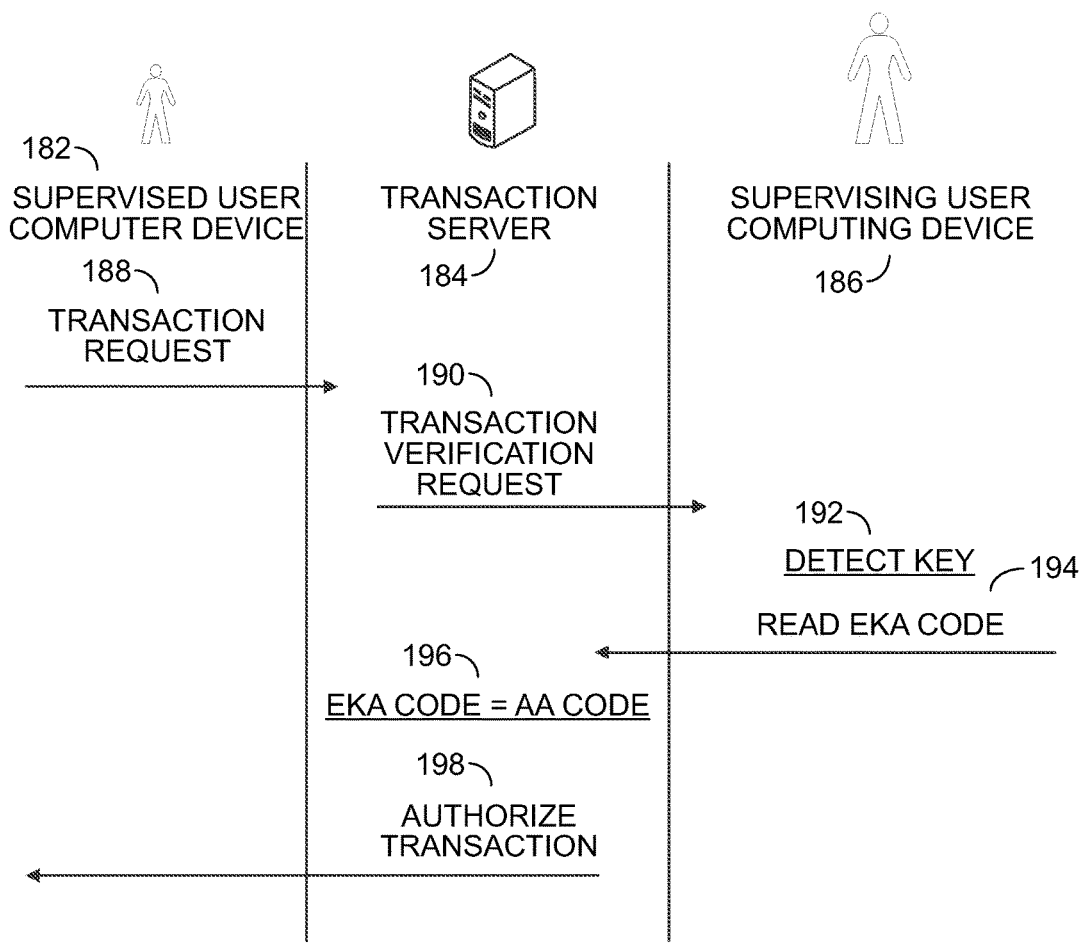
FIG. 2 illustrates a cross function diagram for the actions taken during a transaction verification sequence by components in the system of FIG. 1 in accordance with embodiments herein.

FIG. 2 illustrates a cross function diagram for the actions taken during a verification sequence by the various components in the system 100, to provide a less demanding verification mechanism for parents and other supervisors. The diagram includes three divisions or lanes 182, 184 and 186. The first lane 182 represents a supervised user (e.g., child) division or lane 182 that shows the actions or tasks taken by a comput apparatus 802ing device operated by the supervised user (e.g., child) when trying to acquire (e.g., buy) an item (product or service). The second lane 184 represents a transaction server division or lane 184 that shows the actions or tasks taken by the transaction server 120 to verify a transaction. The third lane 186 represents a supervising user (e.g., parent) division or lane 186 that shows actions taken by a computing device operated by the supervising user (or supervised user with the permission of the supervising user) when verifying the transaction.

Beginning in the upper left corner of the diagram, the supervised user accesses an on-line application, logs onto a supervising user's on-line account, executes a search query for an item of interest (e.g., songs, games, toys, clothes, etc.) and selects the item of interest. The supervised user may go through one or more other operations within the on-line application to initiate the transaction depending on the type of on-line application and account. When the supervised user completes the actions/choices to select the item of interest, the computing device 112 (FIG. 1) operated by the supervised user sends a transaction request 188 to the transaction server 120 (FIG. 1). The transaction server 120 identifies a user account 150 (FIG. 1) associated with the transaction request 188 and obtains a mobile device ID associated with the supervising user's mobile device 102 and obtains an account authorization (AA) code 152 (FIG. 1) (e.g., a password) associated with the supervising user's user account 150 (FIG. 1). The transaction server 120 sends a transaction verification request 190 request to the mobile device 102 of the parent 110. Optionally, the transaction verification request 190 may be sent to the computing device 112 from which the supervised user 109 entered the transaction request. For example, a user account 150 (FIG. 1) may indicate that the transaction verification request 190 should be sent to the computing device 112 from which a transaction request 188 originates. Additionally or alternatively, when the supervised user 109 has his/her own computing device 112, the user account 150 may designate the particular computing device 112 to receive the transaction verification request 190.

The parent's mobile device 102 (FIG. 1) detects 192 whether an assembled transaction verification apparatus 122 has been plugged into the supervising user's mobile device 102. When the assembled transaction verification apparatus 122 is detected 192, the mobile device 102 reads 194 the EKA code 128 on the transaction verification apparatus 122. Both pieces 124, 126 of the transaction verification apparatus 122 should be connected to one another when plugged into the supervising user's mobile device. Otherwise, the EKA code 128 cannot be read from the transaction verification apparatus 122. If both pieces 124, 126 of the transaction verification apparatus 122 are connected to one another and plugged into the mobile device 102, this is taken as an indication that the supervising user has given the supervised user the supervising user's portion of the transaction verification apparatus 122 (or both portions of the transaction verification apparatus). Once, the EKA code 128 is read, the mobile device 102 sends 194 (FIG. 2) the EKA code 128 to the transaction server 120.

The transaction server 120 accesses the user account 150 to obtain an account authorization code 152 associated with the user account 150. At 196, the transaction server compares the EKA code 128 (also referred to as a key authorization code (AC)) and the account authorization (AA) code (also referred to as an AA code or account AC). When the EKA code and AA code match, the transaction server determines that the transaction is authorized and the transaction is authorized 198. The EKA code may not match the AA code. This could occur when the child is not using the correct transaction verification apparatus or that the parent has changed the AA code. If the child is using the wrong transaction verification apparatus or the parent changes the AA code, this it taken as an indication that the parent does not want the child to buy the item that the child is trying to buy. The foregoing process provides an easy mechanism for a parent or other supervising user to regulate transactions by their children or other supervised user. For example, when a parent does not want a child to buy items over the Internet, the parent may withhold all or a piece of the transaction verification apparatus. Alternatively or in addition, the parent may change the AA code associated with the users account. For example when a child loses, or hides the transaction verification apparatus, but the parent does not want the child to buy anything, the parent can change the AA code and obtain a new transaction verification apparatus, thereby rendering the old transaction verification apparatus useless.

Optionally, when a partial match occurs between the EKA code and the AA code, a secondary confirmation mechanism may be implemented. For example, when there is a sufficient degree of match (e.g. as compared to a select threshold of match, such as when half, two thirds, etc. of the EKA and AA codes match), the supervising user 110 may be prompted to confirm the transaction verification request (e.g. through an SMS message) from the mobile device 102 or other computing device.

Figure 3A:
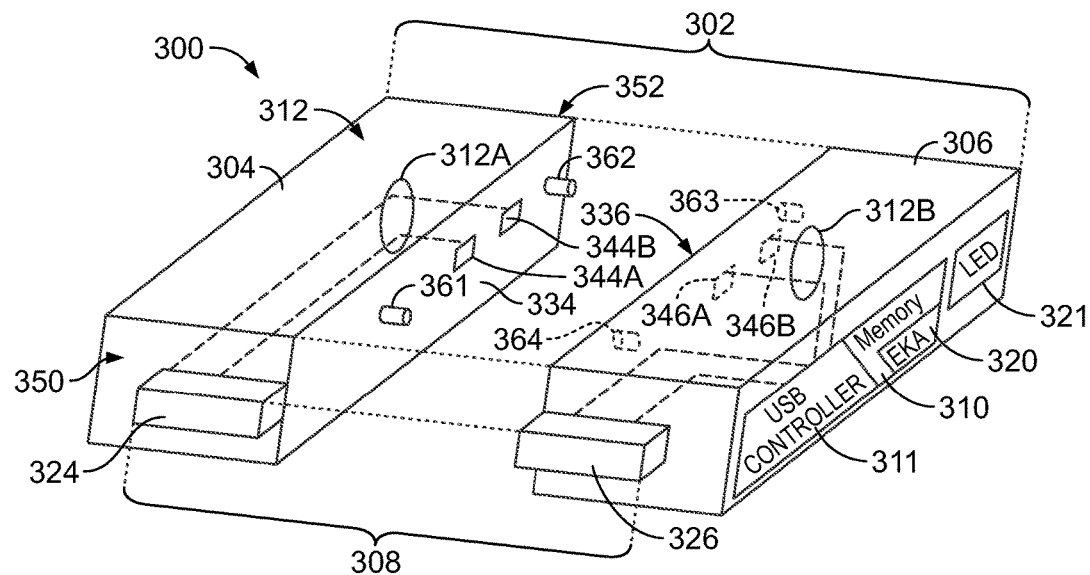
FIG. 3A illustrates a perspective view of a multi-piece transaction verification apparatus formed in accordance with embodiments herein.
Figure 3B:
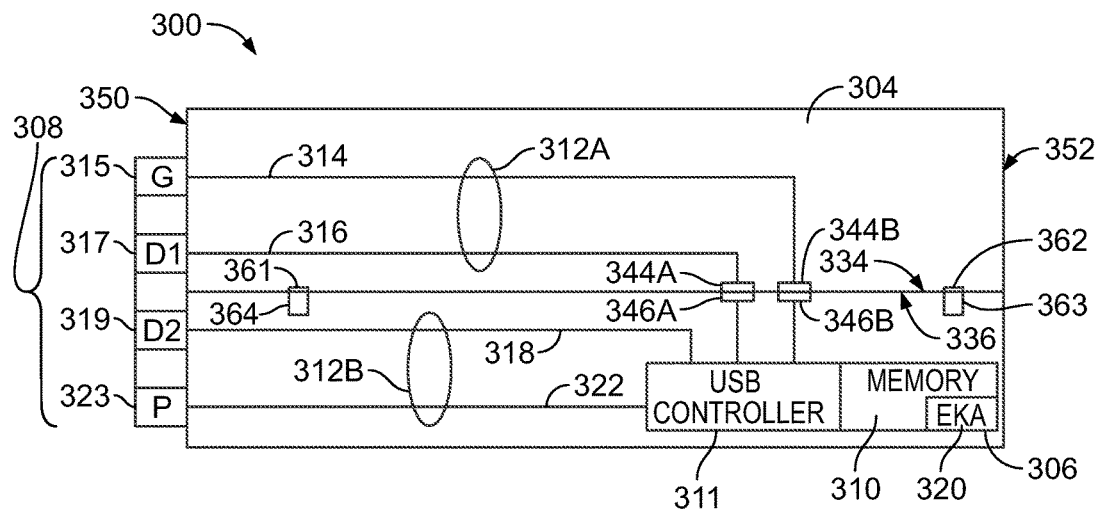
FIG. 3B illustrates a schematic block diagram of the key of FIG. 3A formed in accordance with embodiments herein.

FIG. 3A illustrates a perspective view of a physical layout of a multi-piece transaction verification apparatus 300 for use with a computing device. FIG. 3B illustrates a block diagram of an example of electrical components within the apparatus 300 of FIG. 3A. The apparatus 300 includes a housing 302 separated into first and second housing portions 304, 306 that are physically connectable to, and dis-connectable from, one another. A data interface 308 is to be communicatively coupled to the computing device (102 or 112). A universal serial bus (USB) controller 311 is provided in the housing 302 and directly connected to the data interface 308 over a circuit path 312. The USB controller 311 is connected to memory 310 which stores the EKA code 320 to be read by the computing device. The USB controller 311 manages communication over the data interface 308 in accordance with a USB protocol. The controller 311 may be configured to implement other communication protocols in addition to, or place of, the USB protocol. Optionally, the controller 311 may be omitted entirely when utilizing a protocol configured to communicate between the data interface 308 and the memory 310 without use of a local controller. The EKA code 320 is only readable, by the computing device, from the memory 310 when the first and second housing portions 304, 306 are electrically and physically connected to one another.

In the embodiment of FIGS. 3A and 3B, the data interface 308 is physically divided into first and second partial data interfaces 324, 326. The first partial data interface 324 located on the first housing portion 304 and the second partial data interface 326 located on the second housing portion 306. The memory 310 is located at least partially in the second housing portion 306. The first and second partial data interfaces 324, 326 are to be located proximate to one another when the first and second housing portions 304, 306 are physically connected with one another. In the example of FIGS. 3A and 3B, the data interface constitutes a USB connector that is split between the first and second housing portions 304, 306. Additionally or alternatively, the data interface 308 may be formed as a variety of other electrical connectors having a select number of pins. For example, the data interface 308 may constitute a small form factor pluggable (SFP) connector. Optionally, the data interface 308 may be a proprietary computer bus and power connector created by a provider of mobile and/or computing devices. For example, the data interface may be an 8-pin connector (e.g., the Apple® Lightning™ connector), the Apple® 30-pin connector and the like used to connect mobile devices to host computers, external monitors, cameras, USB battery chargers and other peripherals.

The circuit path 312 includes one or more conductive traces, conductive wires, and the like. The circuit path 312 may be provided as traces on a circuit board, as wires within an interior of the housing 302 or otherwise. The circuit path 312 includes a first partial circuit path 312A and contacts 344A,B within the first housing portion 304 and a second partial circuit path 312B and contacts 346A,B within the second housing portion 306. Optionally, the contacts 344A,B may be replaced or used in combination with an optical connector, a wireless interface, sound transmitter/receiver and other interfaces that complete circuit paths when separate housing portions are assembled. The first and second partial circuit paths 312A, 312B are electrically joining to one another at the contacts 344A,B, 346A,B to directly connect the data interface 308 to the memory 310, when the first and second housing portions 304, 306 are connected to one another.

The first and second housing portions 304, 306 have mating first and second sides 334, 336, respectively, that are configured to be joined with one another. In the embodiment of FIGS. 3A and 3B, the housing 302 is elongated between a mating end 350 and a rear distal end 352. The first and second housing portions 304, 306 connect to one another along an interface that extends along a length of the housing 302 between the mating and distal ends 350, 352. The first and second sides 334, 336 extend generally perpendicular to the mating end 350 and data interface 308. Optionally, the first and second sides 334, 336 may be oriented to extend in other directions relative to the mating end 350 and data interface 308. The contacts 344A,B, 346A,B are located on the mating first and second sides 334, 336, respectively. The contacts 344A,B, 346A,B are aligned with one another to mate and complete the circuit path 312 between the data interface 308 and the memory 310 when the first and second housing portions 304, 306 are physically and electrically connected with one another.

In the example of FIG. 3B, the data interface includes at least two data pins 317, 319, a ground pin 315 and a power pin 323 (also denoted D1, D2, G and P). The first partial circuit path 312A includes conductive traces 314, 316. The conductive trace 314 is joined to and extends from the ground pin 315 to a corresponding contact 344B. The conductive trace 316 is joined to and extends from the data pin 317 to a corresponding contact 344A. The contacts 344A and 344B directly engage contacts 346A and 346B. Contacts 346A,B are joined to linking conductive traces that are in turn connected to the memory 310. The second partial circuit path 312B includes conductive traces 318, 322 that are joined to the data pin 319 and power pin 323, respectively. The conductive traces 318, 322 extend from the data and power pins 319 and 323 to the controller 311 that communicates with the memory 310.

The first side 334 includes one or more fixation features 361, 362, while the second side 336 includes one or more fixation features 363, 364. The fixation features 361-364 mate with one another to securely hold the first and second housing portions 304, 306 against one another. As an example, the fixation features 361-364 may represent posts and holes that frictionally engage one another. Additionally or alternatively, the fixation features 361-364 may represent magnetic elements that attract one another. When using magnetic elements as the fixation features 361-364, the fixation features 361-364 may be structured to be flush (e.g. non-projecting) with the first and second sides 334, 336. Optionally, the fixation features 361-364 may include electro-magnets that afford good contact and good electrical connection between contacts 344A, 346A and between contacts 344B, 346B. Other forms of fixation features (e.g., latches, hooks, and the like) may be used in place of, or in addition to, the fixation features 361-364. Optionally, more or fewer fixation features 361-364 may be used, and the fixation features 361-364 may be located in various positions on the first and second housing portions 304, 306.

One or more of the data interface 308, memory 310 or circuit path 312 are distributed between the first and second housing portions 304, 306 such that, when the first and second housing portions 304, 306 are disconnected from one another, the memory 310 is inaccessible by the computing device. The memory 310 is deemed inaccessible when the EKA code 320 cannot be read from the memory 310. The term "distributed", as used to describe the data interface 308, memory 310 or circuit path 312, includes embodiments in which the component(s) (e.g., the data interface 308, memory 310 and/or circuit path 312) are not all located in a common/single one of the first and second housing portions 304, 306. For example, the entire data interface 308 may be located on/in the first housing portion 304, the entire memory 310 may be located in the second housing portion 306, all or a portion of the circuit path 312 may be provided in the first housing portion 304 and/or all or a portion of the circuit path 312 may be provided in the second housing portion 306. The term "distributed", as used to describe the data interface 308, memory 310 or circuit path 312, also includes embodiments where a physical and functional part of the corresponding component(s) (e.g., the data interface 308, memory 310 and/or circuit path 312) are/is split between, and located in, each of the first and second housing portions 304, 306. As an example, the data interface 308 may be partially located on/in the first housing portion 304 and partially located on/in the second housing portion 306. Additionally or alternatively, the memory 310 may be partially located in the first housing portion 304 and partially located in the second housing portion 306. Non-limiting examples of distributions of the data interface 308, memory 310 and circuit path 312 are provided herein.

Optionally, the transaction verification apparatus 300 may include one or more light emitting diodes (LEDs) 321 that flash, turn on or change color to indicate when the transaction verification apparatus 300 is properly plugged into a computing device. For example, the LED 321 may turn from an OFF state to an ON state when the transaction verification apparatus 300 is properly plugged in to a computing device. Optionally, the LED 321 may change from a red color to a green color when the transaction verification apparatus 300 is properly plugged into a computing device.

In the example of FIGS. 3A and 3B (and in various examples hereafter), a simplified pin configuration is illustrated at the data interface 308. It is understood that the power, ground and data pins may be divided between the first and second housing portions 304, 306 in various configurations. Optionally, more or few pins may be included. Optionally, a number and distribution of the pins may be divided in various manners between the first and second partial data interfaces 324, 326. For example, the ground and power pins may be both located on the first partial data interface 324, while the data pins are located on the second partial data interface 326. Optionally, first and second of the data pins may be located on each of the first and second partial data interfaces 324, 326, respectively. Optionally, multiple ground pins and/or power pin may be provided, where first and second subsets of the ground pins (and/or first and second subsets of power pins) are located on each of the first and second partial data interfaces 324, 326.

Optionally, the components (e.g. the USB controller 311, memory 310, data interface 308, circuit path 312, etc.) may be distributed in various manners between the first and second housing portions 304, 306. For example, the components may be distributed based upon whether a supervising user or a supervised user is intended to retain possession of the corresponding housing portion 304, 306 over an extended period of time. For example, when the first housing portion 304 is intended to be retained by a child while the second housing portion 306 is intended to be retained by a parent, few or none of the electronic components may be housed in the first housing portion 304, but instead simply locate circuit paths 312 within the first housing portion 304 that are necessary and used to interconnect electronic components all housed in the second housing portion 306. By locating the more durable components within the first housing portion 304 intended to be retained by the supervised user (e.g. a child), the overall apparatus 300 may experience a longer useful life.

Figure 4A:
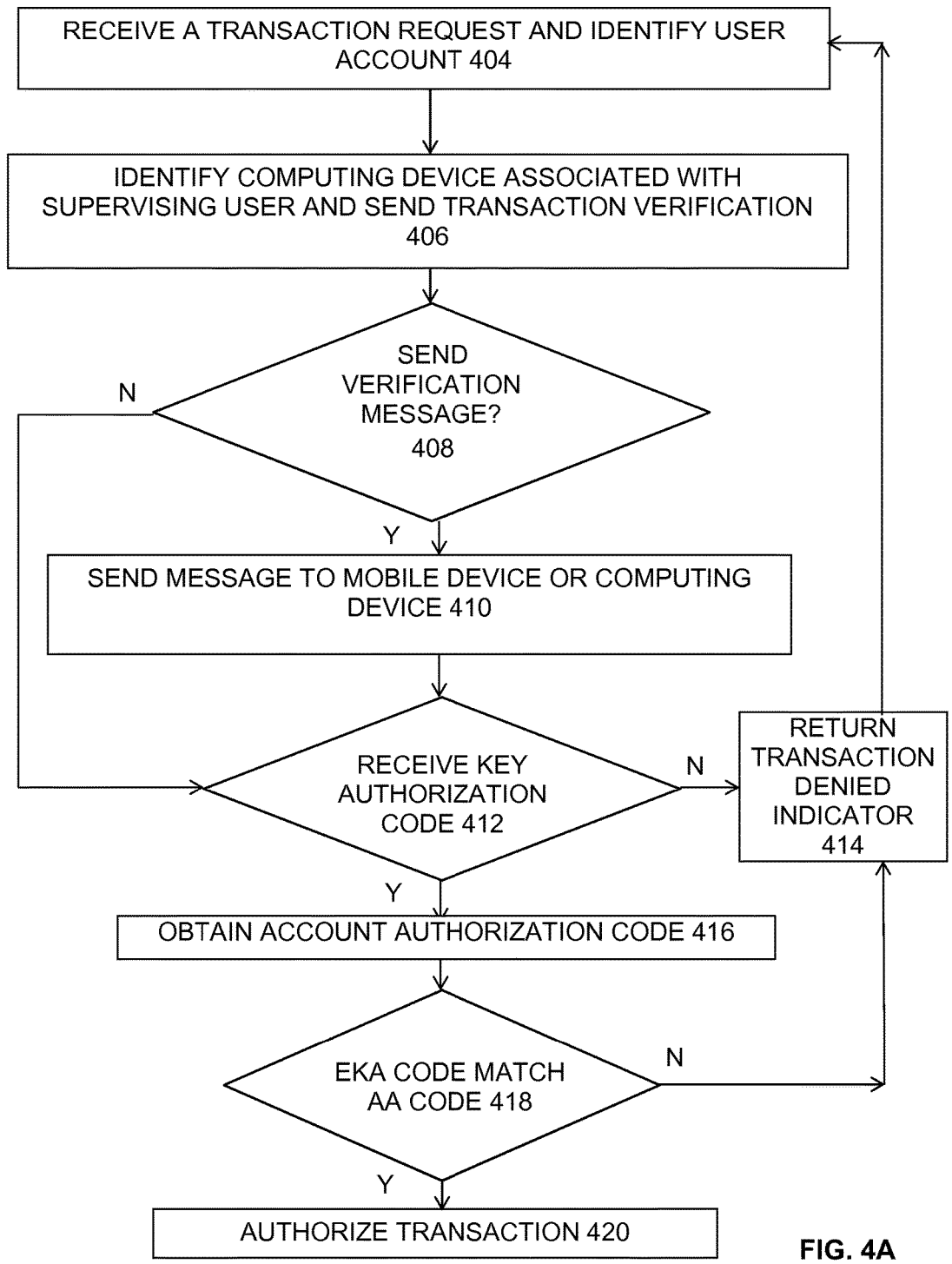
FIGS. 4A and 4B illustrate processes for verifying authorization of on-line transactions in accordance with embodiments herein, where
Figure 4B:
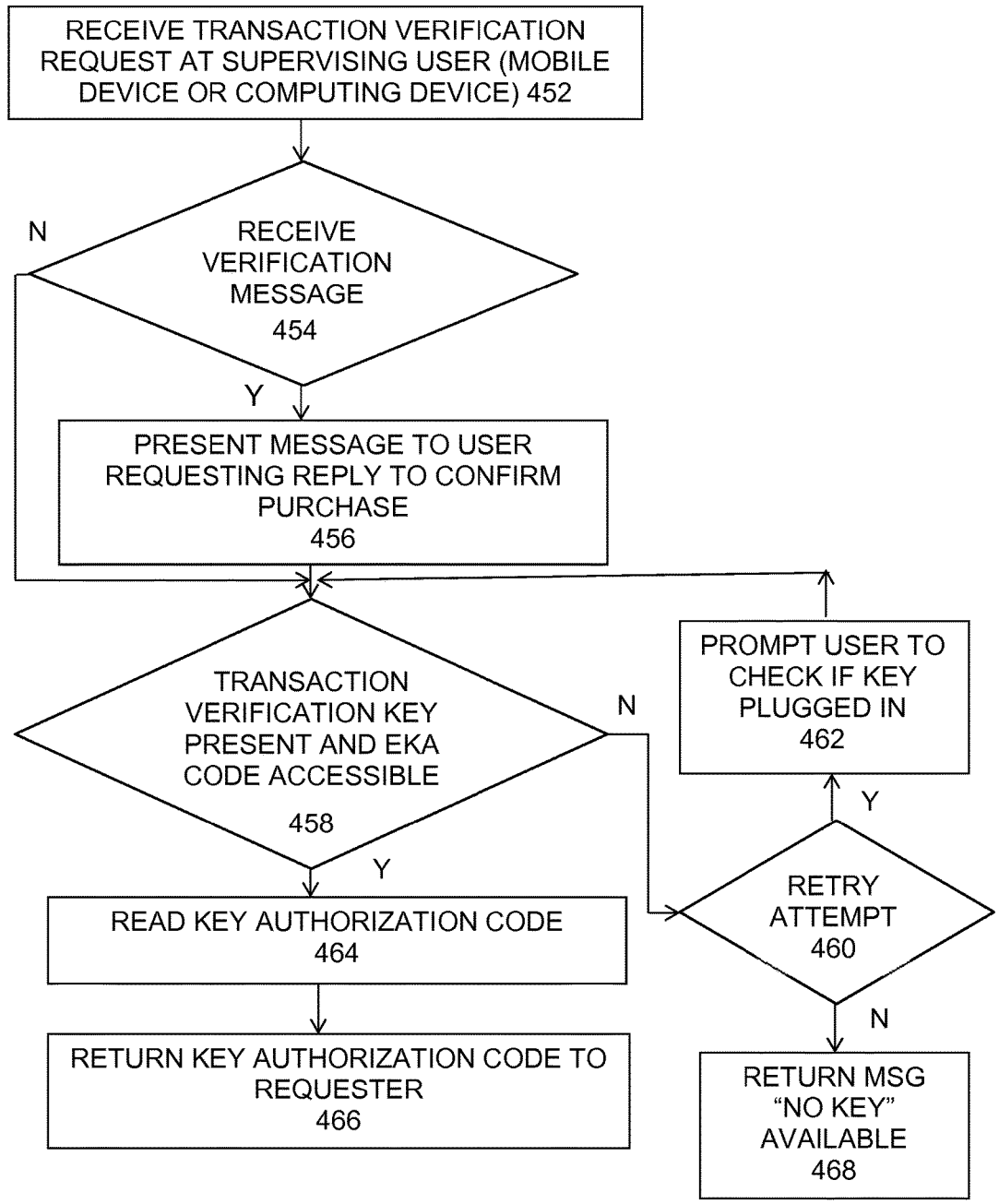

FIGS. 4A and 4B illustrate processes for verifying authorization of transactions, with FIG. 4A from the server-side perspective and FIG. 4B from the client-side perspective. It is understood that operations of FIGS. 4A and 4B may be performed in the order shown, simultaneously, or in other different orders. While examples are described in connection with online transactions, it is understood that the embodiments described herein are not limited to online transactions. In addition, principles and aspects described herein may be implemented with transactions other than online transactions. The operations of FIG. 4A may be performed at one or more transaction servers 120. The operations of FIG. 4A are performed by one or more processes at the direction of programming instructions stored in memory of the transaction server 120.

At 404, the process receives a transaction request. The transaction request is created by a supervised user via a computing device 112(1)-112(M) (or mobile device 102). For example, a supervised user may want to buy/download a game. The supervised user steps through various operations of an on-line application to select the item of interest. The supervised user also steps through operations to designate an on-line user account to be used with the transaction. For example, the supervised user may login to a supervising user's online user account, such as a payment account, or other on-line account. The on-line account may be offered by a variety of product and/or service providers, online shopping services and the like.

The transaction request also includes data indicative of a user account to be used for the transaction. The transaction server 120 uses the data indicative of the user account to access the user account and obtain user account information. The user account includes user account information identifying a supervising user associated with the account. The supervising user also represents an individual who oversees transactions by the supervised user. The user account information may include data indicative of a unique account number, a user phone number, a home address, a user ID, a MAC address and/or other information sufficient to designate a user and/or a mobile or computing device. The user account information is associated with the supervising user or users, such as a parent, a manager, a doctor or other person with authority to oversee transactions involving the user account, including to verify and/or deny transactions.

At 406, the transaction server 120 identifies one or more computing devices associated with the supervising user and/or an account that the supervising user may access using any network connected device. For example, the account may correspond to the user account 150 (FIG. 1), or a separate account, where the separate account is identified in the user account 150. The supervising user may, but need not, be the payer/owner of the user account. For example, a user account may be owned, controlled, and/or include credit card or financial information by or for one person, business, hospital, educational institute and the like. However, the user account may designate a different person as the supervising user other than the person or entity that controls the account. For example, the computing device may be a parent's or doctor's mobile phone or tablet computer. Alternatively or in addition, the computing device may be a personal computer or public computer that the supervising user is presently using. The transaction verification request is treated by the receiving computing device(s) as a request for additional information to confirm approval of the transaction request.

At 406, the transaction server 120 sends a transaction verification request to the supervising user. The transaction verification request is sent to the one or more computing devices associated with the supervising user. Additionally or alternatively, the transaction verification request may be sent to an account (e.g. the user account 150 or a separate account), where the supervising user may access the account using any available device.

At 408, the transaction server 120 determines whether the transaction server 120 should also send a verification message to the supervising user. When a verification message is to be sent, at 410 the message is sent to the one or more computing devices associated with the supervising user. The operations implemented by the computing device are described below in connection with FIG. 4B. At 410, the transaction server 120 may push the message to the computing device to be displayed on the computing device to the user, where the message indicates at least one of the item of interest, a cost of the item and/or an identity of the supervised user entering the transaction request. The verification message may be sent at 410 to the same or a different computing device as the transaction verification request. For example, the transaction verification request may be sent to the same computing device 112(1) used by the child to make an on-line app purchase (e.g., a tablet or PDA). The child may then enter the transaction verification apparatus 122 into the tablet or PDA 112(1). The verification message may be sent to another computing device, such as a parent's mobile phone (102) in order to inform the parent that the child is entering an online transaction.

The determination at 408 (and destination of the message) may be based on various criteria such as user settings, a dollar amount of a transaction, the source/identity of the supervised user entering the transaction request and the like. For example, the user may set up his/her account such that a text message is sent to one or more computing devices when a single transaction exceeds a dollar limit or a series of transactions exceed a cumulative value.

For example, a parent may wish to have a text message pushed to their phone every time a transaction verification request is sent, or only after a select number of transactions in a certain time period.

When no verification message is to be sent, flow proceeds from 408 to 412. Optionally, the decision at 408 and the operation at 410 may be omitted entirely such as in embodiments in which no verification message is utilized.

At 412, the transaction server 120 waits a select period of time, referred to as a select "time out" period, to receive an electronic key authorization (EKA) code 128 from the one or both of the computing devices 102, 112. The "time out" period may represent a user set, factory set or standard amount of time to wait for the EKA code 128. When the transaction verification request is sent to more than one computing device 102 and/or 112, the EKA code 128 may be received from any one or more of the computing devices 102 and/or 112. The EKA code 128 is read from the transaction verification (TV) apparatus 122 once communicatively coupled to a computing device 102. Optionally, at 412, the transaction server 120 may receive an indication (e.g., an acknowledgement) that the transaction verification apparatus is plugged into a mobile device 102 and/or other computing device 112, and that the EKA code 128 was read from the transaction verification apparatus.

When no EKA code is received within the select "time out" period, the transaction server 120 advances flow to 414. When an EKA code is received within the select "time out" period of time, the transaction server 120 advances flow to 416. At 414, the transaction server 120 returns a "transaction denied" notice to the supervised user, namely to the computing device from which the transaction request originated. Optionally, at 414, the transaction server may enter a "retry" or secondary verification process, instead of denying the transaction. A retry verification may involve sending a second transaction verification request (at 406) to the same or a different computing device. For example, during a first iteration through 406, a transaction verification request may be sent to one computing device, such as the primary mobile phone associated with the user account. During the retry/second iteration at 406, the transaction verification request may be sent to one or more addition computing devices associated with the user account, such as another parent's, a doctor's, a teacher's or an older sibling's mobile phone, personal computer, tablet and the like.

Returning to 412, when flow advances to 416, the transaction server 120 obtains an account authorization (AA) code. The AA code(s) may be stored as the user account information. For example, each time a child or other user enters a transaction request identifying a particular user account, the transaction server 120 may access memory in which the user account information is stored. The user account information may include one or more AA codes. The user account information and AA codes may be saved in memory at the transaction server 120, or at a remote memory (e.g. cloud storage, a database or other memory). During account setup, the supervising user may enter the AA code that is saved in memory. When the AA code is entered by the supervising user, a matching EKA code is loaded onto the transaction verification apparatus. Alternatively, the AA code may be designated automatically by a provider of the transaction verification apparatus. For example, when a user obtains (e.g., purchases) a transaction verification apparatus, the key provider may set the EKA code for the key and assign a matching AA code to the user's account. In one example, the EKA and AA codes may remain constant throughout the useful life of the transaction verification apparatus. The EKA and AA codes may have rule sets associated therewith and saved in the user accounts 150 (FIG. 1), where the rules may define spending limits (e.g., single transaction dollar limits or cumulative dollar amounts), time limits (e.g., how much time the kid has played games vs. reading), an absolute number of times the code can be used, etc. Alternatively, the EKA and AA codes may rotate or otherwise change. The EKA and AA codes may change periodically or randomly based on a select encryption routine. The EKA and AA codes may be very simple or complex. For example, the EKA and AA codes may be set by the supervising user as a simple password defined by at least one of a color scheme, an alphanumeric sequence, or a keyword. For example, the transaction verification apparatus 300 may include a cryptographic processor configured to generate the EKA code. Alternatively, the EKA and AA codes may use a public key infrastructure (PKI). Optionally, the EKA and AA codes may be encrypted or use hashes from other values to generate the codes.

Optionally, the EKA code be part of a multi-factor authentication scheme, such as a scheme that comprises a knowledge factor and/or and inherence factor, as well as a possession factor. For example, the EK a code may include a knowledge factor (e.g. something the supervising user knows, such as a password or PIN) or an inherence factor (e.g. biometrics). The transaction verification apparatus 122 plays a role in the possession factor, in that the supervising user controls at least partial possession of the transaction verification apparatus 122.

Additionally or alternatively, for added security, the EKA code 128 may be created to be cryptographically verifiable by the transaction server 120 or other system to which the EKA code 128 is to be provided or another system that operates in conjunction with the transaction server 120 or other system to which the EKA code is to be provided. For example, the EKA code 128 may be encrypted so as to be decryptable by the transaction server 120 or system that will cryptographically verify the EKA code, where the ability to decrypt the EKA code 128 serves as cryptographic verification of the EKA code 128. As another example, the EKA code 128 may be digitally signed (thereby producing a digital signature of the EKA code) such that the digital signature is verifiable by the mobile device 102, computing device 112, transaction server 120 or other system that will cryptographically verify the EKA code.

In other examples, both encryption and digital signatures may be used for cryptographic verifiability (and security). The transaction verification apparatus 122 may be used to encrypt and/or digitally sign the EKA code may vary in accordance with various embodiments and the same key is not necessarily used for both encryption and digital signing, where applicable. In some embodiments, a transaction verification apparatus 122 may be used to encrypt the EKA code 128 as a public key of a public/private key pair where the private key of the key pair is maintained securely by the transaction server 120 or system to which the EKA code 128 is to be provided, thereby enabling the transaction server 120 or system to decrypt the EKA code 128 using the private key of the key pair. Using the public key to encrypt the EKA code 128 may include generating a symmetric key, using the symmetric key to encrypt the EKA code 128, and encrypting the symmetric key using the public key, where the encrypted symmetric key is provided to a transaction server 120 or system with the encrypted EKA code to enable the transaction server 120 or system to use the corresponding private key to decrypt the symmetric key and use the decrypted symmetric key to decrypt the EKA code.

Further, in some embodiments, the EKA code 128 may be digitally signed using a private key of a public/private key pair corresponding to the computer system that encrypts and/or digitally signs the EKA code (e.g., the user device). For example, an application that manages EKA codes 128 may be provisioned with the private key and the EKA code may include a certificate for the private key for use by the transaction server 120 or a system for verification of the digital signature of the EKA code 128. Other variations, including variations where a symmetric key shared between the user device 102, 112 and the transaction server 120 that cryptographically verifies the EKA code is used to encrypt and/or digitally sign the EKA code. The EKA code 128 may be implemented as a file, a digital artifact, or both. For example, the EKA code may be an eXtensible Markup Language (XML) or JavaScript Object Notation (JSON) file or artifact that is readable by a browser control, native code, ActiveX, or other software, possibly through use of an application program interface (API).

Optionally, at 416, the transaction server 120 may calculate the AA code automatically and/or in response to receipt of a transaction request. The transaction server 120 may automatically rotate to a new AA code based on select criteria (e.g., periodically, the type of transaction, which supervised user requests the transaction). Optionally, the transaction server 120 may receive a seed or other data input from the transaction verification apparatus 122 and use a hash function to convert or map the input seed to an AA code. The AA code returned by the hash function are represent hash values, hash codes, hash sums, or simply hashes. The seed may be received from a source other than the transaction verification apparatus, such as from the computing device, the supervising user, the supervised user and the like. The seed may be a part of the EKA code, where the transaction server 120 pulls the seed from the EKA code and used the seed to generate the AA code at 416.

At 418, the transaction server 120 determines whether the EKA code matches the AA code associated with the user account. A match between the EKA code and the AA code is recognized by the transaction server 120 as approval of the transaction. When the EKA code and AA code do not match, flow moves to 414 and the operations discussed above are performed. When the EKA code and AA code do match, flow moves to 420.

At 420, the transaction server 120 authorizes the transaction request in order that the transaction request by the supervised user is fulfilled. The transaction server 120 may authorize the transaction request in various manners depending upon the type of transaction and the configuration of the network and application platform in which the transaction is requested. For example, the transaction server 120 may simply provide an indication that a match has occurred between the EKA code and AA code. As another example, the transaction server 120 may perform all or a portion of the remaining operations needed to complete the transaction. For example, when an order is received at the transaction server 120, products server 114 (FIG. 1) or elsewhere within the network (e.g., details of product, quantity, delivery information), a customer may be authenticate, the order is processed (e.g., check product availability, authorize payment, parental controls), and the order is fulfilled. For example, to fulfill the order, a product or service may be made available for download, a message sent to a fulfillment center to pack a product in a box and ship the product, etc. Optionally, when one or more other servers 114 (FIG. 1), networks or computing systems are involved to complete the transaction, at 420, the transaction server 120 may simply return an instruction or message to the other server 114 indicating that the transaction has been authorized. For example, the transaction server 120 may convey an "authorized" instruction or message to the other server 114, network or computing system.

FIG. 4B illustrates a portion of the process for verifying authorization of transactions in accordance with embodiments herein. The process of FIG. 4B may be implemented by a computing device, to which the transaction server 120 sends the transaction verification request. For example, the process of FIG. 4B may be implemented by any of the computing devices 102 and/or 112(1)-112(M). Optionally, the process of FIG. 4B may be implemented only by a computing device 102 designated in the user account 150 as the only computing device 102 authorized to receive and reply to a transaction verification request.

At 452, the computing device 102 receives the transaction verification request from the transaction server 120 (as sent from operation 406 in FIG. 4A). The transaction verification request may simply indicate that a transaction has been requested. Alternatively, the transaction verification request may include additional information. For example, the transaction verification request may identify the user requesting the transaction, the item of interest, the dollar amount for the transaction and the like. The transaction verification request may identify the computing device from which the request is being made. Optionally, the transaction verification request may include historic information. For example, the historic information may include a cumulative value of prior transactions for a select period of time, a number of transactions for a select period of time and the like.

The transaction verification request may also include or be followed by a verification message sent from the transaction server 120. At 454, the computing device 102 determines whether a verification message has been received with or following the transaction verification request. When a verification message is received at 454, flow moves to 456. At 456, the verification message is presented to the user. By way of example, the message may be displayed via a display device associated the computing device 102. Alternatively or additionally, the message may be presented as an audio message over a speaker of the computing device 102. Optionally, embodiments may be implemented, in which the computing device displays a verification message, even though no verification message is conveyed to the computing device 102. For example, the computing device 102 may generate the verification message based on the data included in the transaction verification request. Following the operation at 456, flow proceeds to 458.

Returning to 454, when no verification message is received, flow moves to 458.

At 458, the computing device 102 determines whether a transaction verification apparatus has been communicatively coupled to the computing device 102. At 458, the computing device 102 also determines whether the EKA code can be read from the transaction verification apparatus. For example, when the transaction verification apparatus is of the type to be physically plugged into a data port on the computing device 102, the computing device 102 searches the corresponding data port for the transaction verification apparatus. Alternatively, when the transaction verification apparatus is of the type that wirelessly communicates with the computing device 102, the computing device 102 seeks to establish a communications link with the transaction verification apparatus. For example, a wireless communications link may be initiated when the computing device 102 begins to broadcast advertisements to be detected by a transaction verification apparatus or begins to search for an advertisement by a transaction verification apparatus.

At 458, the computing device 102 searches for the transaction verification apparatus for a select period of time. When the transaction verification apparatus is detected and the EKA code is read, flow moves to 464. When no transaction verification apparatus is detected within the select period of time, flow moves to 460. At 460, the computing device 102 determines whether a retry attempt should be made to afford the user the opportunity to retry entering the transaction verification apparatus and EKA code. When a retry attempt is to be made, flow proceeds to 462. When the computing device 102 determines that no more retry attempts should be made, flow proceeds to 468.

Optionally, during 458 (or at a different point in the process), when the fixation features utilize electro-magnets, the computing device 102 may cause the electro-magnets to become energized in order to pull the two pieces of the key closer together when plugged into the computing device 102.

At 462, the computing device 102 prompts the user to determine whether the key is plugged in correctly or at all. Following the prompt at 462, flow may return to 458 where the computing device 102 checks for the transaction verification apparatus again. The operations at 458-462 may be repeated one or more select times before it is determined that no transaction verification apparatus is present. Thereafter, the decision at 460 determines that no more retry attempts should be made and flow moves to 468 where the computing device 102 returns a message "no key" available to the transaction server 120.

Returning to 458, when flow moves to 464, the computing device 102 reads the EKA code on the transaction verification apparatus. At 466, the computing device 102 returns the EKA code to the transaction server 120.

Figure 5:
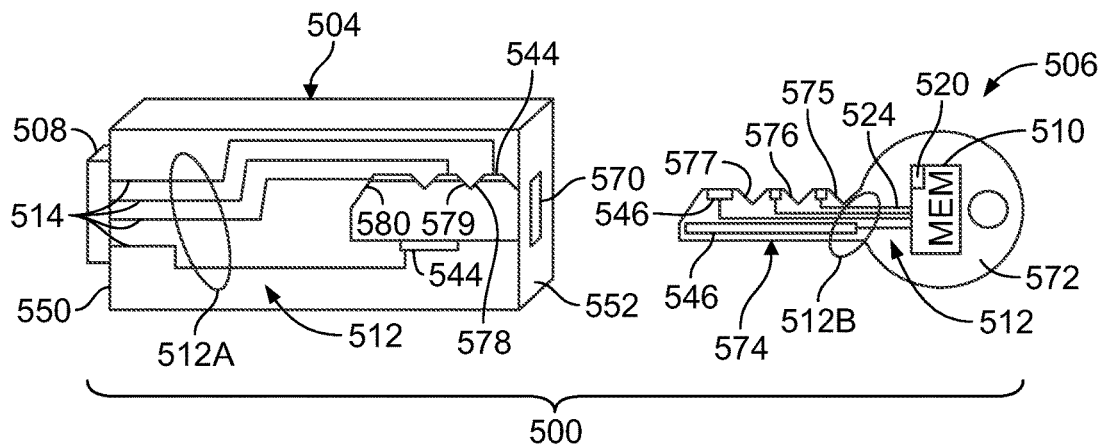
FIG. 5 illustrates a transaction verification apparatus formed in accordance with embodiments herein.

FIG. 5 illustrates an alternative embodiment for a transaction verification apparatus 500 formed in accordance with an embodiment. The transaction verification apparatus 500 includes first and second housing portions, also referred to hereafter as a lock portion 504 and a key portion 506, respectively. The lock portion 504 includes a device mating end 550 and a distal end 552. The distal end 552 includes a receptacle 570. The key portion 506 is shaped to fit into the receptacle 570. The key portion 506 has a base 572 and a stem 574 extending from the base 572. The stem 574 includes keying features 575-577 on a perimeter thereof (e.g., along one or more edges or sides of the stem 574). For example, the keying features 575-577 may be includes ribs, notches, peaks and valleys, similar to keying features on a standard lock, house key, car key and the like. The receptacle 570 includes keying features 578-580 that match and mate with the keying features 575-577.

The lock and key portions 504, 506 are physically connectable to, and dis-connectable from, one another. A data interface 508 is provided on the device mating end 550 of the lock portion 504. The data interface 508 is to be communicatively coupled to a computing device. Memory 510 is provided in the key portion 506. The memory 510 stores the EKA code 520. The EKA code 520 is only readable, by the computing device, from the memory 510 when the key portion 506 is fully inserted into the lock portion 504 and the lock and key portions 504, 506 are electrically and physically connected to one another.

In the embodiment of FIG. 5, the data interface 508 is formed as a single un-divided connector. The memory 510 is located at least partially in the key portion 506. The data interface 508 may be formed as a USB connector or as a variety of other electrical connectors having a desired number of pins.

The circuit path 512 includes one or more conductive traces, conductive wires, and the like. The circuit path 512 may be provided as traces on a circuit board or wires within an interior of the housing or otherwise. The circuit path 512 includes a first partial circuit path 512A and contacts 544 within the lock portion 504 and a second partial circuit path 512B and contacts 546 within the key portion 506. The contacts 544, 546 may be provided on all, a portion or none of the keying features 575-580. To avoid overcomplicating FIG. 5, only a portion of the contacts 544, 546 are separated denoted with lead lines. As examples, one or more contacts 544, 546 may be provided on the keying features 575-580. Additionally or alternatively, one or more contacts 544, 546 may be provided along opposite edges and/or along one or both sides of the stem 574. The first and second partial circuit paths 512A, 512B are electrically joining to one another at the contacts 544, 546 to directly connect the data interface 508 and the memory 510, when the lock and key portions 504, 506 are connected to one another.

The data interface 508 includes one or more data and power pins (not shown). The first partial circuit path 512A includes conductive traces 514. A conductive trace 514 is joined to, and extends from, a ground contact (not shown) to a corresponding contact 544. One or more conductive traces 514 are individually joined to, and extend from, one or more associated power and data pins to the corresponding contact 544. The contacts 544 directly engage contacts 546. Contacts 546 on the key portion 506 are joined to conductive traces 524 that are in turn connected to power, ground and data terminals of the memory 510.

Optionally, the memory 510 may be partially housed in the lock portion 504 and partially in the key portion 506 with the corresponding contacts 544, 546 interconnecting partial sections of memory 510. Optionally, the memory 510 may be located entirely in the lock portion 504 and not in the key portion 506. When the memory 510 is entirely housed in the lock portion 504, the circuit paths 512A, 512B may arranged such that conductive traces 524 still extend through the key portion 506 to interconnect one or more of the ground, power and data terminals of the memory 510 to associated ground, power and data contacts on the data interface 508.

While not shown, optionally, the transaction verification apparatus 500 may include a communications controller, such as a USB controller (e.g. similar to the USB controller in FIG. 3) that may be located in either of the key portions 504 or 506. Alternatively, when a communications protocol is implemented that does not utilize a local controller, the transaction verification apparatus 500 may omit a communications controller entirely.

Figure 6:
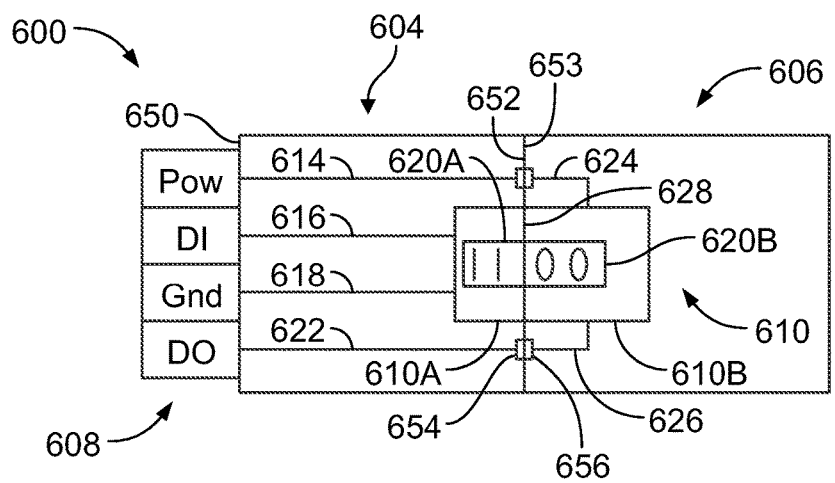
FIG. 6 illustrates a transaction verification apparatus formed in accordance with embodiments herein.

FIG. 6 illustrates a schematic view of an alternative embodiment for a transaction verification apparatus 600 formed in accordance with an embodiment. The transaction verification apparatus 600 includes first and second housing portions 604, 606, also referred to hereafter as a proximal portion 604 and a distal portion 606, respectively. The proximal portion 604 includes a device mating end 650 and a distal end 652. The distal end 652 includes an interface to be securely and electrically connected to a lead end 653 of the distal portion 606. Contacts 654 and 656 are provided at the distal end 652 and the lead end 653 (are positioned to align with one another) at each point where a conductive circuit path extends between the proximal and distal potions 604, 606. The distal end 652 and the lead end 653 include mating features, such as posts, holes, magnets, latches and the like to render the proximal and distal portions 604 and 606 physically connectable to, and dis-connectable from, one another.

A data interface 608 is provided on the device mating end 650 of the proximal portion 604. The data interface 608 communicatively couples to the computing device when plugged into a data port on the computing device. A memory 610 is divided into partial memory 610A and 610B. The partial memory 610A is provided in the proximal portion 604, while the partial memory 610B is provided in the distal portion 606. One or both of the partial memories 610A, 610B store the EKA code. For example, the EKA code may be split into partial EKA codes 620A and 620B that are stored in the partial memories 610A and 610B, respectively. As in other embodiments, the EKA code 620A, 620B is only readable, by the computing device, from the memory 610 when the data interface 608 is plugged into the computing device and the proximal and distal portions 604, 606 are electrically and physically connected to one another.

In the embodiment of FIG. 6, the data interface 608 is formed as a single un-divided connector with ground, power and data pins. The circuit path includes conductive traces, conductive wires, and the like, as well as contacts to form interconnections there between. The circuit path may be provided as traces on a circuit board or wires within an interior of the proximal and distal portions 604, 606. The circuit path includes conductive traces 614, 616, 618, 622, 624 and 626. The conductive traces 616 and 618 extend between the data interface 608 and the partial memory 610A. The conductive traces 614 and 622 extend from the data interface 608 to contacts 654 at the distal end 652 of the proximal portion 604. The conductive traces 624 and 626 extend between the partial memory 610B and the contacts 656 at the lead end 653 of the distal portion 606.

The partial memories 610A, 610B interconnect with one another through one or more contacts, pins or conductive traces at an inter-memory interface 628. The interface 628 joins the partial EKA codes 620A, 620B. The EKA codes 620A, 620B may be provided through a collection of discrete buffers and latches that store corresponding portions of the EKA code. For example, a first-in-first-out (FIFO) buffer may be used with a portion of the FIFO buffer provided in the partial memory 610A and a portion of the FIFO buffer provided in the partial memory 610B. As an example, when the EKA code is a four bit code 1100, the buffer in the partial memory 610A may store bits "11", while the buffer in the partial memory 610B may store bits "00". When the partial memories 610A, 610B are combined, the complete EKA code is read OUT in a FIFO order as "1100". Optionally, other buffer sizes, buffer types and the like may be used. Optionally, the partial memories 610A, 610B may save the EKA code in memory structures other than a buffer configuration.

While not shown, optionally, the transaction verification apparatus 600 may include a communications controller, such as a USB controller (e.g. similar to the USB controller in FIG. 3) that may be located in either of the proximal and distal portions 604 or 606.

Figure 7:
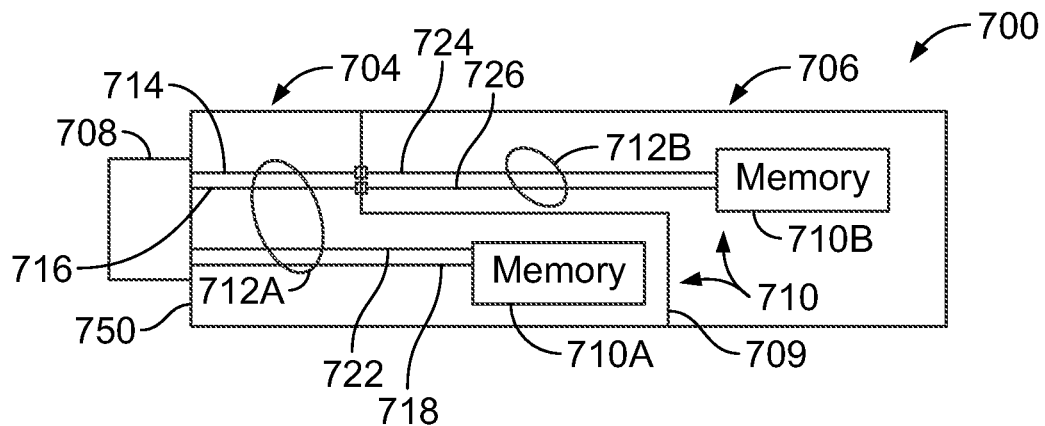
FIG. 7 illustrates a transaction verification apparatus formed in accordance with embodiments herein.

FIG. 7 illustrates a transaction verification apparatus 700 formed in accordance with an alternative embodiment. The transaction verification apparatus 700 includes first and second housing portions 704, 706 that are joined along a stepped or non-linear interface 709. The non-linear interface 709 may be useful to form additional contours in the interface that facilitate a secure connection between the first and second housing portions 704, 706. Contacts are provided at each point where a conductive circuit path extends between the first and second housing potions 704, 706. The non-linear interface 709 includes mating features, such as posts, holes, magnets, latches and the like.

A data interface 708 is provided on the device mating end 750 of the first housing portion 704. A memory 710 is divided into partial memories 710A and 710B that are separately read by the computing device through the data interface 708. The partial memory 710A is provided in the first housing portion 704, while the partial memory 710B is provided in the second housing portion 706. One or both of the partial memories 710A, 710B store the EKA code. The circuit path 712A, 712B is split between the first and second housing portions 704, 706. The partial memory 710A is connected through conductive traces 718 and 722 to the data interface 708, and is separately accessed by the computing device. The partial memory 710B is connected through conductive traces 714, 716, 724 and 726 to the data interface 708, and is separately accessed by the computing device.

The partial memories 710A, 710B may be read separately, in order that the computing device is able to determine when only the first housing portion 704 is plugged in. For example, when the first housing portion 704 is plugged in with the wrong second housing portion 706 (or the second housing portion 706 is not completely plugged in at interface 709), the computing device may read the partial memory 710A and determine that the partial memory 710B is not readable. In response thereto, the computing device may inform the user that the second partial memory 710B is not readable and may offer suggestions, such as to check the connection between the two halves of the apparatus 700, to check to make sure the correct second housing portion 706 is used and the like.

Optionally, the memory 710A may still be accessible and usable, even when the second housing portion 706 is disconnected. For example, the first housing portion 704 may be used as a USB memory stick to store data, however the user would not be able to access the EKA code unless the first and second housing portions 704, 706 are connected. For example, the EKA code may be located in the partial memory 710 B. Optionally, an "enable" pin may be provided on the second housing portion 706 that, when connected, instruct a controller (e.g., a USB controller 311 in FIG. 3B) to access the EKA code.

While not shown, optionally, the transaction verification apparatus 700 may include a communications controller, such as a USB controller (e.g. similar to the USB controller in FIG. 3) that may be located in either of the first and second housing portions 704 or 706.

Figure 8:
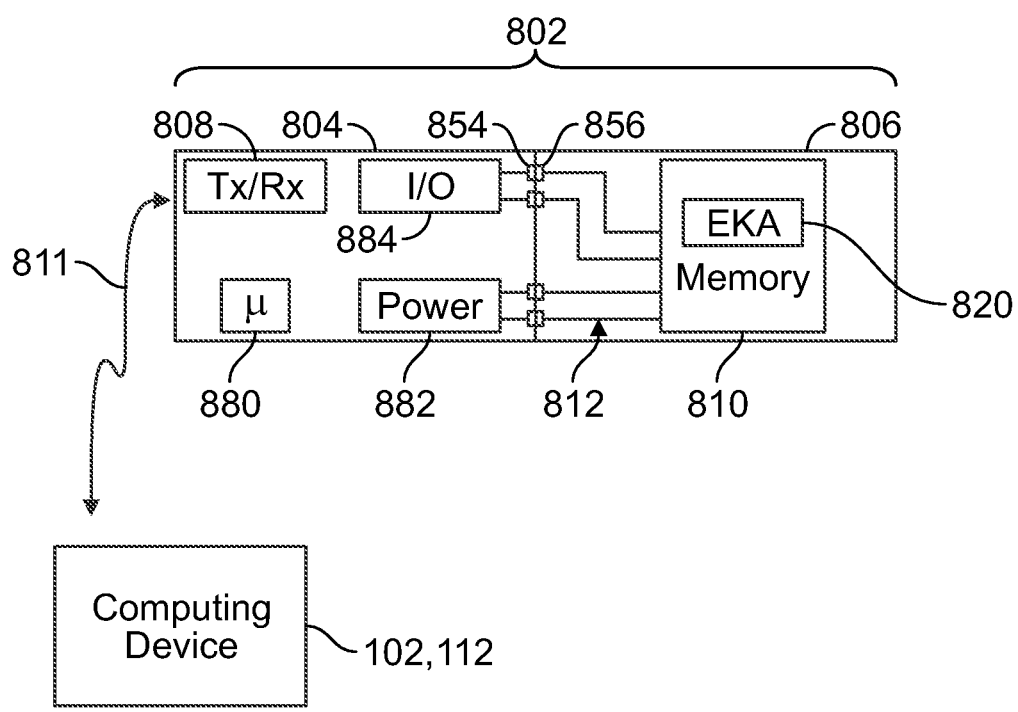
FIG. 8 illustrates a transaction verification apparatus formed in accordance with embodiments herein.

FIG. 8 illustrates a block diagram of an example of an apparatus 802 formed in accordance with an embodiment. The apparatus 800 includes a housing separated into first and second housing portions 804, 806 that are physically connectable to, and dis-connectable from, one another. In the embodiment of FIG. 8, the data interface is formed as a transceiver 808 that wirelessly communicates bi-directionally with computing devices, such as 102 and 112. Memory 810 is provided in the second housing portion 806 and is directly connected to the transceiver 808 over circuit path 812. The memory 810 stores the EKA code 820.

The first housing portion 804 also includes additional processing components, such as a microprocessor 880, a power supply 882 and an input/output (I/O) unit 884. The I/O unit 884 manages communication with the memory 810. The power supply 882 may be a variety of known power sources, such as a battery (rechargeable or non-rechargeable), a solar power source, and the like. The power supply 882 provides power to the transceiver 808, microprocessor 880, I/O unit 884, and memory 810. The microprocessor manages operation of the apparatus 802.

During operation, when the second housing portion 806 is connected to the first housing portion 804, the action of interconnection may wake-up the microprocessor 880. For example, the I/O unit 884 may include an interconnection monitoring function, whereby the I/O unit 884 delivers a wake-up signal to the microprocessor 880 when the first and second housing portions 804, 806 are interconnected. For example, the interconnection monitoring function may include detection by the I/O unit 884 that a circuit path has been closed at the contacts 854 (e.g. when the mating context 856 are properly aligned). Alternatively or additionally, the wake-up signal may be delivered to the microprocessor from the memory 810, transceiver 808 or any other electrical component. Alternatively or additionally, the wake-up signal may simply represent delivery of power to the microprocessor 880, where power is only supplied to the microprocessor 880 when the power supply 882 is connected to a circuit path through the second housing portion 806.

Once the microprocessor 880 is woken up, the microprocessor 880 directs the transceiver to listen for an advertisement from the mobile device 102 and/or begin to broadcast an advertisement indicating the presence of the apparatus 802, in accordance with various protocols (e.g., Bluetooth®, Bluetooth Low Energy®, Wi-Fi®, etc.). Optionally, other protocols may be used to establish a communications link between the transceiver 808 and a computing device 102, 112 (that may use alternative advertising methods or not use any advertising method). At the request of the computing device 102, 112, the microprocessor 880 reads the memory 810 through the I/O unit 884, and passes the EKA code 820 to the computing device 102, 112 over a wireless link 811. The microprocessor 880 may read the EKA code 820, without a request from the computing device 102, 112, simply in response to a determination that the first and second housing portions 804, 806 are connected to one another. Optionally, the microprocessor 880 may "push" the EKA code 820 to the computing device 102, 112 without receiving a request.

The apparatus 802 provides a data interface that does not require a physical connection between the apparatus 802 and a computing device 102, 112. Instead, the apparatus 802 is readable when the first and second housing portions 804, 806 are connected together and the apparatus 802 is within wireless communications range of the computing device 102, 112.

Optionally, the processor 880 may be split between the first and second housing portions 804, 806. For example, limited or simple processors 880 may be provided in the first and second housing portions 804, 806, where each processor 880 is configured to perform a portion of the operations implemented in connection with communicating with the computing device 102, 112 and reading and transmitting the EKA code 820.

Figure 9A:
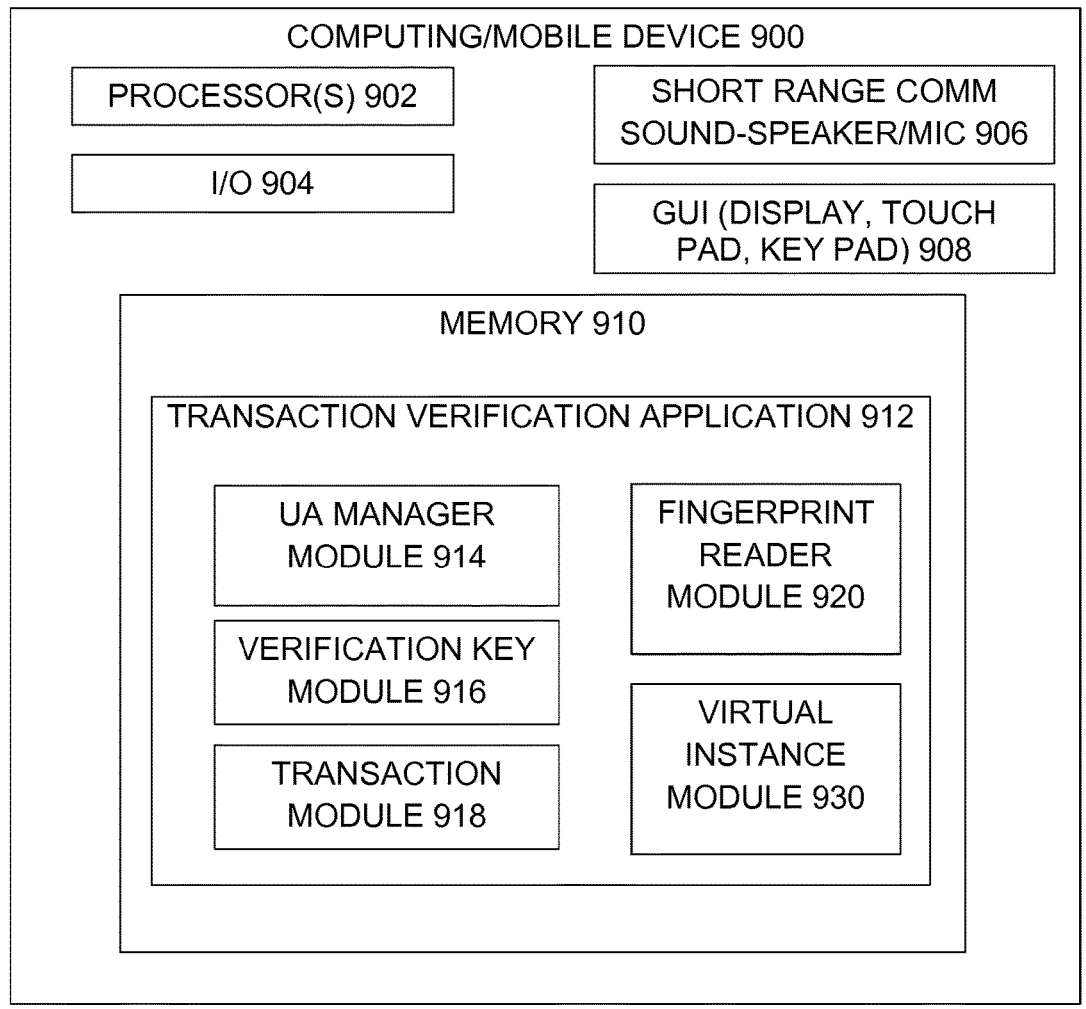
FIG. 9A illustrates a block diagram of a computing device utilized in accordance with embodiments herein.

FIG. 9A illustrates a block diagram of a computing device 900 formed in accordance with an embodiment. The computing device 900 may be any one or more of the computing devices 112(1)-112(M) or mobile device 102 in FIGS. 1 and 8. The computing device 900 includes one or more processors 902, a data input/output (I/O) interface 904, a short range communications interface 906 (e.g., speakers and a microphone), a graphical user interface (GUI) 908 and memory 910. Optionally, the communications interface 906 may include an optical based (e.g. infrared) communications interface, a wireless (e.g. Bluetooth®) interface, etc. In addition to NFC, other means for short-range inter-device communication may also be utilized in accordance with the systems and methods of the present disclosure. Such compatible technologies include, but are not limited to, induction wireless, infrared wireless (such as technologies operating according to specifications and protocols provided by the Infrared Data Association, or IrDA) or ultra wideband formats. In some embodiments, 900 may utilize short-range, low-power and high-frequency radio transmissions, such as Bluetooth®. In still other embodiments, 900 may support acoustic-based data transfer. For example, one device may include software components and a speaker that enable it to broadcast data to another device as sound waves, while the other device may include software components and microphone that enable the other device to receive the data embedded in the sound waves. Thus, one or more of radio signal-based data transfer (e.g., NFC or Bluetooth®), light-based data transfer (e.g., infrared data transfer), an acoustic-based data transfer (e.g., sound wave-embedded data), or magnetic field-based transfer (e.g., reading from a magnetic stripe) may be used for inter-device communication. The protocols and components for enabling computing devices to perform the systems and methods of the present disclosure using such means for inter-device communication are well known to those skilled in the art of computer communications and thus, need not be described in more detail herein.

The memory 910 stores various information including a transaction verification application (TVA) 912. The memory 910 may direct the processor(s) 902 to, among other things, perform the operations described in connection with FIG. 4B. The data I/O interface 904 includes a data port that receives the apparatus 300, 500, 600, 700, when plugged into the computing device 900. For example, the data I/O interface 904 may be a USB port, or another type of data/power port. The data I/O interface 904 also may include a transceiver to communication wirelessly with the apparatus 802.

The processor(s) 902 perform the various general operations associated with a computing device, such as associated with a mobile phone, a table computer, a laptop or desktop computer and the like. In addition, the processors 902 perform operations, under the direction of program instructions stored in the memory 910, to implement the TVA 912.

The transaction module 918 communicates with the transaction server 120 as explained herein. Among other things, the transaction module 918 receives the transaction requests over the network from the transaction server 120. The transaction module 918 informs a verification key module 916 of the transaction request. The transaction module 918 may also receive and manage display of verification messages. Optionally, the transaction module 918 may generate verification messages based on information received in the transaction verification request. For example, the transaction module 918 may generate a text message to be displayed on the user interface 908 to inform the supervising user of the name of the supervised user, the item selected and the price (if appropriate) and/or length of a temporary transaction (e.g. the length of a movie, Internet session, home entertainment session and the like). For example, when a child wishes to initiate an Internet session, home entertainment session, etc., the verification message may indicate "Sophie wants to watch YouTube videos", "Abby wants to watch the Muppet movie".

The verification key module 916 searches for and identifies the presence of a transaction verification apparatus 300, 500, 600, 700, 800. The verification key module 916 also reads the EKA code from the transaction verification apparatus when the EKA code is accessible. When the EKA code is not accessible or a transaction verification apparatus is not plugged in, the verification key module 916 informs the transaction module 918.

A finger print reader module 920 may be included in the TVA 912. The finger print reader module 920 scans a user's finger print (e.g., when a parent or child holds a finger against the GUI 908 on a smart phone). The finger print reader module 920 may be an integrated application within the computing device 900, or alternatively a separate device that is connected to the computing device 900. The fingerprint reader module 920 may be used to collect fingerprints as an EKA code, and thereby permit the transaction verification apparatus 300, 500-800 to be omitted entirely. For example, the EKA code may represent a combination of one or more digital fingerprints. For example, the EKA code may include a fingerprint of a parent, where the parent enters his/her fingerprint by holding one or more select fingers against his/her mobile device (or more generally any computing device) while the mobile device scans the finger(s). Alternatively or in addition, a child user may holding one or more select fingers against the same or a different mobile device (or more generally any computing device), while the mobile device scans the finger(s). The parent's and/or child's fingerprints along or together may form the entire EKA code, in which case, the transaction verification apparatus 300, 500, 600, 700, 800 may be omitted entirely.

Optionally, the fingerprint(s) of a supervising user and/or supervised user alone or together may form a portion of the EKA code that is used in combination with an EKA code read from a transaction verification apparatus 300, 500, 600, 700, 800.

By way of example, when using a pair of fingerprints (dual fingerprints), the supervising user and supervised user may enter their fingerprints using a common finger print reader such as the finger print reader on the supervising user's computing device 102. Optionally, the supervising user and supervised user may enter their respective fingerprints using the fingerprint readers on different computing devices 102, 112.

In addition, a time limit may be set during which the supervised user and supervising user both enter their fingerprints in order for the pair of fingerprints to be considered a valid dual fingerprint. For example, once a child enters his/her fingerprint, the time window would start for when the parent enters his/her fingerprint, or vice versa. If both fingerprints are not entered during the time window before the time limit times out, then the pair of fingerprints is deemed invalid.

A record of the supervising and supervised user's fingerprints may be saved at the transaction server 120, in the corresponding user account 150, in one or more computing devices 102, 112 owned or controlled by the supervising user.

Optionally, the computing device 900 may include a transaction verification virtual instance module 930 that generates a virtual instance of a transaction verification apparatus, instead of relying on a physical transaction apparatus as shown in FIGS. 3A, 3B, and 5-8. The transaction verification virtual instance module 930 directs a virtual instance of a transaction verification session to be initiated and illustrated on the display of the GUI 908.

Figure 9B:
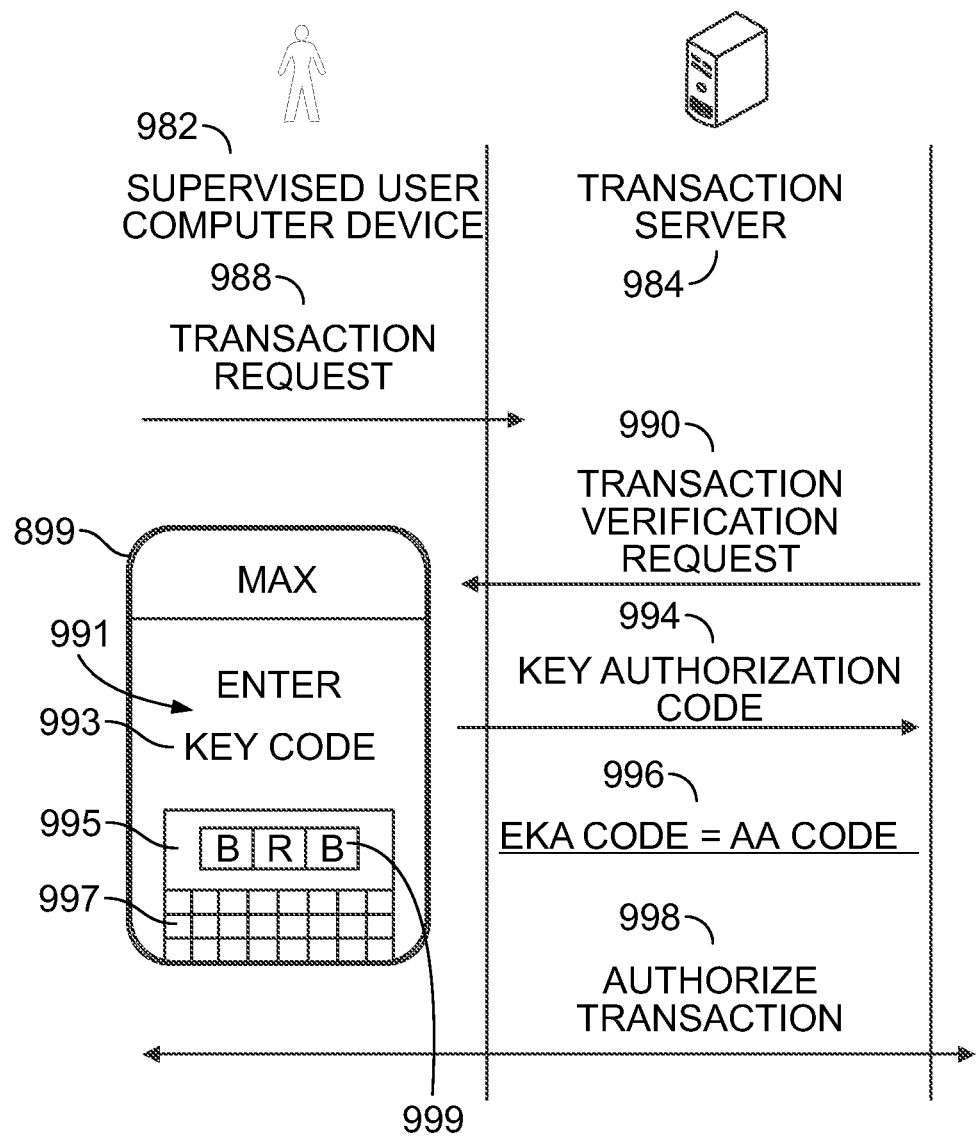
FIG. 9B illustrates a cross function diagram for the actions taken during a virtual instance of a transaction verification apparatus in accordance with embodiments herein.

FIG. 9B illustrates a cross function diagram for the actions taken during a verification sequence in connection with implementing a virtual instance of a transaction verification apparatus in accordance with embodiments herein.

The diagram includes two divisions or lanes 982, 984. The first lane 982 represents a supervised user (e.g., child) division or lane 982 that shows the actions or tasks taken by a computing device operated by the supervised user (e.g., child) when trying to acquire (e.g., buy) an item (product or service). The second lane 984 represents a transaction server division or lane 984 that shows the actions or tasks taken by the transaction server 120 to verify a transaction. The first lane 982 also illustrates a virtual instance of a transaction verification apparatus that may be implemented in accordance with embodiments herein. Using virtual instance reduces the number of physical apparatus (e.g. housing portions) to keep track of and assemble to verify a transaction.

The virtual instance of the transaction verification apparatus may be illustrated on the display of the GUI 908 of the computing device 900. The virtual instance of the transaction verification apparatus prompts the supervised user to enter an EKA code which may represent a one-time use or multiuse code. P Once the supervised user enters the EKA code, the transaction verification virtual instance module 930 passes the entered EKA code to the transaction server 120 that compares the entered EKA code with the AA code in the user account 150.

When the entered EKA code and stored AA code match, the transaction server 120 may return an indication that the passwords match. The transaction verification key virtual instance module 930 may animate the illustrated instance of the transaction verification key to enter a virtual lock and unlock the virtual lock. In the embodiment using a virtual instance of the transaction verification key, no separate physical transaction verification key is used.

Beginning in the upper left corner of the diagram, the supervised user accesses an on-line application, and select an item of interest similar to the operations described above. As explained above, the supervised user may go through one or more other operations to initiate the transaction. When the supervised user completes the actions/choices to select the item of interest, the computing device 102, 112 operated by the supervised user sends a transaction request 988 to the transaction server 120.

In accordance with one implementation, the transaction server 120 may return a transaction verification request 990 to the same computing device 900 from which the transaction request 988 originated. Alternatively or in addition, the transaction server 120 may identify a user account 150 (FIG. 1) associated with the transaction request 988 and obtain a mobile device ID associated with another computing device 102, 112, to which the transaction verification request 990 is to be sent. Additionally or alternatively, when the supervised user 109 has his/her own computing device 900, the user account 150 may designate the particular computing device 900 to receive the transaction verification request 990. Optionally, the transaction server 120 may simply send a message to the computing device 900, 102, 112 identified in the user account to inform the supervising user that the supervised user is seeking to complete a transaction.

As explained above, the transaction server 120 also uses the transaction request 988 to identify the user account 150 and obtain therefrom, an account authorization (AA) code 152 (FIG. 1) (e.g., a password) associated with the supervising user's user account 150 (FIG. 1).

Optionally, the action 990 may be omitted entirely. For example, the virtual instance module 920 may be implemented such that, when a supervised user selects an item and seeks to complete a transaction, the virtual instance module 920 may skip the action at 990 and immediately prompts the supervised user for the EKA code.

Whether in response to receiving a transaction verification request 990 or in response to transmitting a transaction request 988, the virtual instance module 920 causes a virtual instance of a transaction verification apparatus to be implemented on the computing device 900. The virtual instance of the transaction verification apparatus directs an EKA entry window 991 to be displayed on the GUI 908. The EKA entry window 991 may include an instructional message 993 (e.g. a message to prompt the supervised user for an EKA code). The EKA entry window 991 also includes a code entry area 995 and a virtual keypad 997 from which the supervised user enters the EKA code. The virtual keypad 997 may represent a virtual alphanumeric keypad, a numeric keypad and the like displayed on the GUI 908. Optionally, the virtual keypad 997 may include non-alphanumeric theme based keys, such as when the supervised user is a small child. As one example, the theme based keys may represent pictures of cartoon or television characters (e.g. Dora, Backpack, Sponge Bob, Bugs Bunny, etc.). Alternatively or additionally, the theme based keys may represent colors (e.g. red, blue, white), animals, nature scenes, and the like. The supervised user enters a virtual EKA code through the keypad 997, with the virtual EKA code displayed in the code entry area 995.

In the example of FIG. 9B, the supervised user has entered an EKA code 999 as "Blue, Red, Blue". As an alternative example, the supervised user may enter the EKA code 999 as "Dora, Dora, Backpack". Optionally, the characters or symbols displayed on the virtual theme based keys may be chosen by the supervising user (e.g., through a menu of available characters and symbols) at the time that the AA code is entered in the user account 150. Optionally, the supervising user may load pictures or images to be used as the characters or symbols, or may copy characters or symbols from Internet sites. Optionally, the EKA code 999 may represent a one-time use code or a limited use code. For example, when the supervising user enters the AA code 152 (FIG. 1), the supervising user may also enter a number of uses/transactions for which the AA code 152 is valid, a period of time in which the AA code 152 is valid, or other temporal/use based limitations on the amount of time or number of transactions that the AA code 152 remain valid.

When the EKA code 999 has been entered, the supervised user may select "enter" or take another action to indicate that the supervised user is ready to submit the EKA code 999. The virtual instance module 920 conveys at 994, the virtual EKA code 999 (entered at the code entry area 995), to the transaction server 120. The transaction server 120 accesses the user account 150 to obtain one or more AA code(s) 152 associated with the user account 150. At 996, the transaction server 120 compares the EKA code 999 to the AA code 152. When the EKA code 999 and AA code 152 match, the transaction server 120 determines that the transaction is authorized. At 998, the transaction server 120 authorizes the transaction. The transaction authorization at 998 may be passed back to the computing device 900, 102, 112 being operated by the supervised user. Alternatively or in addition, the transaction authorization at 998 may be passed to a separate server (e.g., product server 114) or computing system that undertakes the appropriate actions to fulfill the transaction request.

The EKA code may not match the AA code. This may occur when the supervised user does not enter the correct virtual EKA code, or when the supervising user has changed the AA code. If the supervised user is using the wrong EKA code or the supervising user changes the AA code, this is taken as an indication that the supervising user does not want the supervised user to complete the transaction. The foregoing process provides an easy mechanism for a parent or other supervising user to regulate transactions by their children or other supervised user. For example, when a parent does not want a child to buy items over the Internet, the parent may withhold all or a piece of the transaction verification apparatus.

Alternatively or in addition, the parent may change the AA code associated with the users account. For example when a child loses, or hides the transaction verification apparatus or has learned a virtual EKA code that the child was not supposed to know, but the parent does not want the child to buy something, watch video, download games, etc., the parent can change the AA code. When using physical transaction verification apparatus, the parent may then obtain a new transaction verification apparatus, thereby rendering the old transaction verification apparatus useless.

Optionally, when a partial match occurs between the EKA code and the AA code, a secondary confirmation mechanism may be implemented. For example, when there is a sufficient degree of match (e.g. as compared to a select threshold of match, such as when half, two thirds, etc. of the EKA and AA codes match), the supervising user 910 may be prompted to confirm the transaction verification request (e.g. through an SMS message) from the mobile device 102 or other computing device 112.

A UA manager module 914 affords the supervising user the ability to access the user account and, among other things, add and change the AA code and the EKA code on the transaction verification apparatus. For example, a parent, doctor or other supervising user may lose control over a transaction verification apparatus, or feel that he/she has lost control over transactions with their user account. As another example, the supervising user may simply want to add an additional AA code and transaction verification apparatus to their account. For these and other reasons, the supervising user may want to add/change the AA code(s) and EKA code(s). To do so, the supervising user may open the UA manager module 914 on their phone and log into their user account. Optionally, the UA manager module 914 may automatically log onto their user account when the UA manager module 914 is opened.

When the supervising user wants to change the AA code stored in the user account for an existing transaction verification apparatus 300, 500-800 (or virtual instance 899), the supervising user plugs the existing transaction verification apparatus (if used) into the computing device 102, 900 and opens the transaction verification application 912. The supervising user directs the UA manager module 914 within the TVA 912 to change the AA code stored in the user account 150 (FIG. 1). The supervising user may also direct the UA manager module 914 to change the EKA code. In response to the supervising user instruction, the UA manager module 914 accesses the memory 310, 510-810 on the apparatus 300, 500-800 and changes the EKA code to correspond to the new AA code. To add an additional transaction verification apparatus 300, 500-800 (or virtual instance 899) the supervising user would open the TVA 912 and use the US manager module 914 to log onto his/her user account and add an additional AA code. The supervising user would also plug a new transaction verification apparatus 300, 500-800 into the computing device 102, 900 and direct the UA manager module 914 to access the memory on the new transaction verification apparatus. The UA manager module 914 loads, into the memory, the new EKA code that corresponds to the additional AA code.

By way of example, the supervising user may use the UA manager module 914 to create a temporary password that is saved in memory saving the user account 150. The password may be valid for a "one-time use password", such that, when the supervised user enters the one-time-use password, the password no longer is valid. For example, when the supervising-supervised users are a parent and child, the parent can enter a one-time use password, such as a color scheme (e.g., red, white, blue), into the user account 150. The parent would then give the color scheme one-time-use password to the child who could enter the code to self-validate one transaction. Optionally, the parent would set a dollar limit for the one-time-use password.

Once the child uses the one-time-use password, the use parent would need to reset the password by entering a new color scheme, a new alphanumeric sequence, a new sequence of cartoon characters (e.g., Dora, Dora, Backpack, Diego; or Sponge Bob, Patrick, Mr. Krabs). By entering the one-time-use password, the child is able to unlock the user account for one purchase under a certain dollar amount without bothering the parent during the transaction.

The one-time-use (or longer term) passwords may be varied in level of complexity based on the age of the child or other supervised user. The one-time-use (or longer term) password may be automatically generated by the transaction server 120, by the transaction verification application 912 and the like. When a one-time-use password is automatically generated for use with a young child, the password may be based on a recent episode of a cartoon, such as the main characters in an episode (e.g., Dora, Backpack, Diego; or Sponge Bob, Patrick, Mr. Krabs).

Figure 10A:
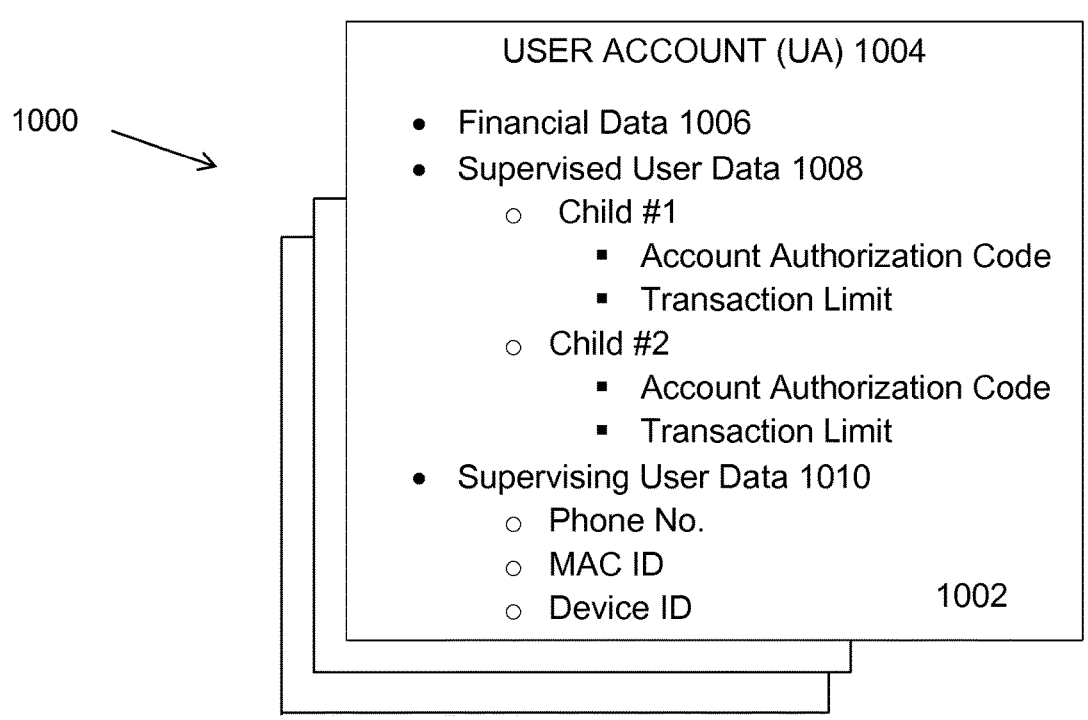
FIG. 10A illustrates a block diagram of a collection of user accounts formed in accordance with embodiments herein.

FIG. 10A illustrates a block diagram of a collection 1000 of user accounts 1002 formed in accordance with an embodiment. The user accounts 1002 may be stored in one or more memory at the transaction server 120, on a local area network, on a wide area network, within a networked computing environment, at one or more data centers or elsewhere. The user accounts 1002 include various user account information. For example, each user account 1002 includes an account identifier (ID) 1004, financial data (e.g., credit card information, stored-value account information, etc.) 1006 associated with a person or entity responsible for the account, supervised user data 1008 and supervising user data 1010 to uniquely identify each supervising user (e.g., a name of each parent).

The supervised user data 1008 may simply represent an account authorization code to be compared to the EKA code. Optionally, the supervised user data 1008 may allow the supervising user to provide more detailed management of individual supervised users. For example, the supervised user data 1008 may identify one or more supervised users (e.g., children), and one or more account authorization codes. The supervising data 1010 may include data uniquely identifying one or more computing devices (CD ID) at which a supervising user can be reached. The CD ID may represent mobile phone number(s) of one or more parents' mobile phones, phone numbers associated with the parents' tablet computers, MAC addresses of one or more computing devices used/owned by the parents, a device ID of a computing device and the like.

The supervised data may be generic to apply to all supervised users that are authorized to use the account, such as all of the children in one family, all employees in one department, etc. Alternatively, the supervised data may be uniquely associated with individual users (e.g., individual children) or sets of users. For example, the parent may setup one account authorization code for an older child, and setup a different account authorization code for a younger child. Optionally, a manager may set up one AA code for a sales department and a different AA code for a purchasing department. Optionally, teachers may set up one AA code for all of their students that are six years of age and younger, and set up another AA code for all of their students that are older than six years of age.

The user account information may also include other data. For example, the account information may include data indicative of at least one of i) a dollar amount limit for approved transactions associated with the account authorization code, and ii) distinct account authorization codes for corresponding individual supervised users. For example, a parent user may enter a dollar amount limit that their child or children can spend on a single transaction, or a dollar amount limit that their child or children can cumulatively spend on multiple transactions. When the dollar amount limit is exhausted, the child is not permitted to make any more purchases. The parent may then enter the account and reset the dollar amount limit.

Optionally, the user accounts 1002 may include temporal limits associated with the dollar amount limits. For example, the dollar amount limit may be for a select period of time (e.g., a day, week, or month), after which the dollar amount limit may reset. When the supervised user cumulatively buys products/services that use up the dollar limit amount, then the supervised user is not permitted to make any more purchases within the current select period of time (e.g., within the current week or month). Once the period of time expires, the dollar amount limit may reset. Once the dollar amount limit resets, the supervised user may then enter new transactions.

Figure 10B:
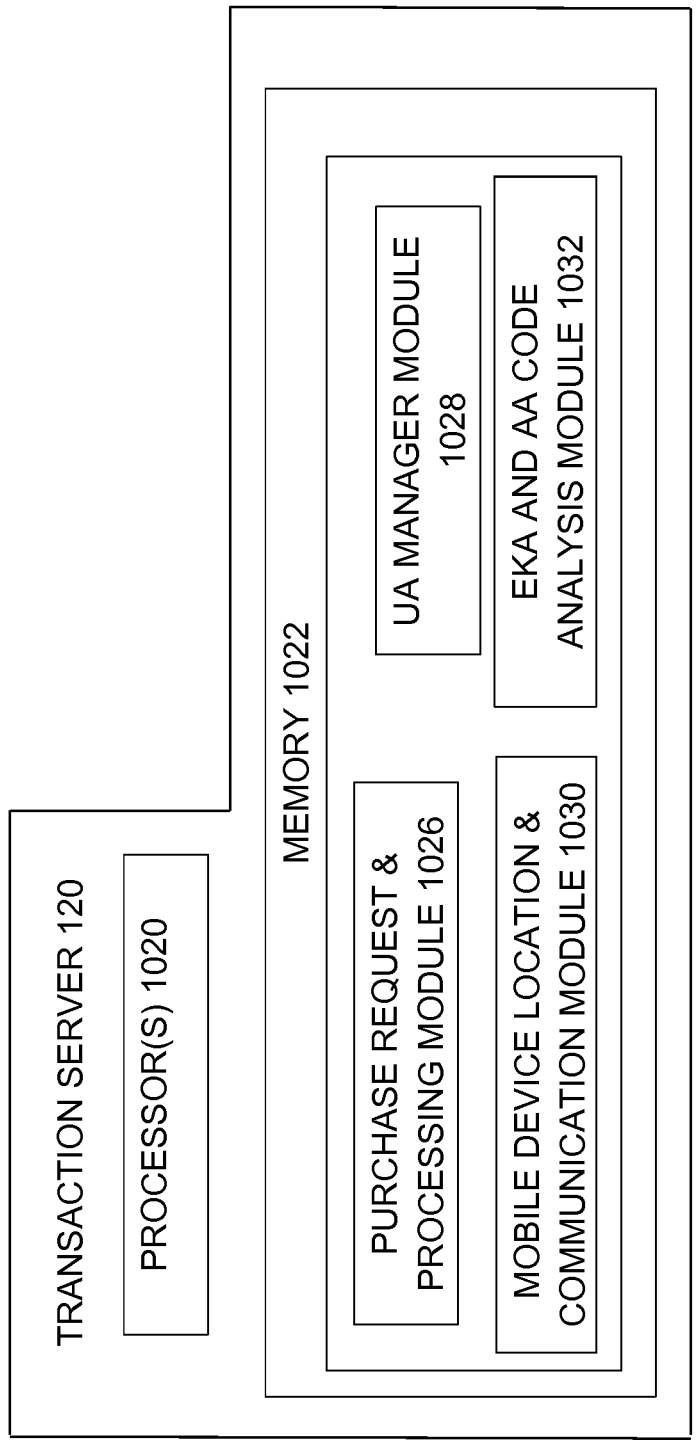
FIG. 10B illustrates a block diagram of a transaction server formed in accordance with embodiments herein.

FIG. 10B illustrates a block diagram of a transaction server 120 formed in accordance with embodiments. The transaction server 120 includes one or more processors 1020 and memory 1022. The memory 1022 stores various information. The memory 1022 may store the account information, as well as program instructions to direct the processor(s) 1020 to implement the operations discussed and illustrated herein. For example, the memory 1022 includes instructions to receive and process the transaction requests, generally denoted as transaction request and processing module 1026. The memory 1022 further includes instructions to enable the supervising user to create, edit, manage user accounts, generally denoted as UA manager module 1028. The memory 1022 further includes instructions to locate and bi-directionally communicate with a computing device used by one or more supervising user, generally denoted as mobile device location and communication (MDLC) module 1030. The MDLC module 1030 sends a transaction verification request to designated computing devices, and receives the EKA code from the computing device(s) that communicates with the transaction verification apparatus.

The memory 1022 further includes instructions to direct the processor(s) 1020 to analyze the EKA and AA codes to determine matches there between and the like, generally referred to as the EKA and AA code analysis module 1032. Optionally, the analysis module 1032 may identify partial matches between the EKA code and the AA code. When partial matches are identified, the analysis module 1032 may implement additional steps to obtain a secondary confirmation, such as directing the communication module 1032 request a verification from the supervising user. Alternatively or additionally, the secondary confirmation a secondary question presented to the supervised user on the computing device 102, 112 being used by the supervised user.

The UA manager module 1028 includes instructions to receive an input indicative of the account authorization code. For example, input may be from the supervising user. Optionally, UA manager module 1028 may include instructions to calculate the account authorization code (as explained herein). The UA manager module 1028 may automatically rotate to a new AA code based on select criteria. The UA manager module 1028 may include instructions to obtain the AA code by obtaining a password defined by at least one of a color scheme, an alphanumeric sequence, or a keyword. The UA manager module 1028 may include instructions to receive the EKA code from the memory in connection with a determination that the transaction verification apparatus is physically plugged into a data port on a computing device.

In accordance with at least one embodiment herein, to the extent that computing or mobile devices are discussed herein, it should be understood that they can represent a very wide range of devices, applicable to a very wide range of settings. Thus, by way of illustrative and non-restrictive examples, such devices and/or settings can include mobile telephones, tablet computers, and other portable computers such as portable laptop computers.

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

The modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the modules/controllers herein may represent circuit modules that may be implemented as hardware with associated instructions (for example, software stored on a non-transitory and non-transitory computer readable storage medium, such as a computer hard drive, ROM, RAM, or the like) that perform the operations described herein. The above examples are exemplary only, and are thus not intended to limit in any way the definition and/or meaning of the term "controller." The modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A computer-implemented method, comprising:
receiving a transaction verification request from a first computing device at a second computing device associated with a supervising account;
displaying, by the second computing device, a transaction approval request corresponding to the transaction verification request;
determining, by the second computing device, that a first housing portion of a transaction verification apparatus and a second housing portion of the transaction verification apparatus are connected to one another and in communication with the second computing device, the first housing portion of the transaction verification apparatus and the second housing portion of the transaction verification apparatus being connected to one another when a circuit between a first memory located in the first housing portion and a second memory located in the second housing portion is completed;
obtaining, by the second computing device, a first portion of an electronic key authorization (EKA) code from the first memory located in the first housing portion of the transaction verification apparatus and a second portion of the EKA code from the second memory located in the second housing portion of the transaction verification apparatus in response to determining that the first housing portion and the second housing portion of the transaction verification apparatus are connected to one another and in communication with the second computing device; and
sending, by the second computing device, the EKA code to the first computing device.

2. The computer-implemented method of claim 1, further comprising determining that the transaction verification apparatus is connected to the second computing device and that the first portion of the EKA code and the second portion of the EKA code are readable from the transaction verification apparatus.

3. The computer-implemented method of claim 1, further comprising determining, by the first computing device in communication with the second computing device, that the EKA code received from the second computing device matches an account authorization code associated with the supervising account, wherein a match between the EKA code and the account authorization code authorizes a transaction request received by the first computing device.

4. The computer-implemented method of claim 3, wherein the transaction request is received by the first computing device from a third computing device associated with a supervised user and is authorized based at least in part on a determination that the transaction request meets a predefined criteria.

5. The computer-implemented method of claim 3, further comprising obtaining data indicative of a user account based at least in part on information in the transaction verification request.

6. The computer-implemented method of claim 3, further comprising obtaining the account authorization code by at least one of:
automatically calculating the account authorization code; or
receiving an input indicative of the account authorization code.

7. The computer-implemented method of claim 3, further comprising sending a message to the second computing device, the message indicating at least one of an item requested, a cost of the item, or an identity of a supervised user entering the transaction request.

8. The computer-implemented method of claim 3, wherein at least part of the account authorization code is one of a color sequence, an alphanumeric sequence, or a keyword.

9. A system, comprising:
a first computing device comprising a processor and a memory, the first computing device being associated with a supervising account; and
an application comprising machine-readable instructions stored in the memory of the first computing device that, when executed by the processor of the first computing device, cause the first computing device to at least:
receive a transaction verification request from a second computing device;
display a transaction approval request corresponding to the transaction verification request;
determine that a first housing portion of a transaction verification apparatus and a second housing portion of the transaction verification apparatus are connected to one another and in communication with the first computing device, the first housing portion of the transaction verification apparatus and the second housing portion of the transaction verification apparatus being connected to one another when a circuit between a first memory located in the first housing portion and a second memory located in the second housing portion is completed;
obtain a first portion of an electronic key authorization (EKA) code from the first memory located in the first housing portion of the transaction verification apparatus and a second portion of the EKA code from the second memory located in the second housing portion of the transaction verification apparatus in response to determining that the first housing portion and the second housing portion of the transaction verification apparatus are connected to one another and in communication with the first computing device; and
transmit the EKA code to the second computing device.

10. The system of claim 9, wherein the application further comprises machine-readable instructions that cause the first computing device to at least determine that the transaction verification apparatus is connected to the first computing device and that the first portion of the EKA code and the second portion of the EKA code are readable from the transaction verification apparatus.

11. The system of claim 9, wherein:
the application is a first application;
the processor is a first processor;
the memory is a first memory;
the second computing device comprises a second processor and a second memory; and
a second application comprising machine-readable instructions stored in the second memory of the second computing device, when executed by the second processor of the second computing device, causes the second computing device to at least:
determine that the EKA code received from the first computing device matches an account authorization code associated with the supervising account, a match between the EKA code and the account authorization code authorizing a transaction request received by the second computing device.

12. The system of claim 11, wherein the transaction request is received by the second computing device from a third computing device associated with a supervised user and is authorized based at least in part on a determination that the transaction request meets a predefined criteria.

13. The system of claim 11, wherein the second computing device further comprises machine-readable instructions that cause the second computing device to at least obtain data indicative of a user account based at least in part on information in the transaction verification request.

14. The system of claim 11, wherein second computing device further comprises machine-readable instructions that cause the second computing device to at least send a message to the first computing device, the message indicating at least one of an item requested, a cost of the item, or an identity of a supervised user entering the transaction request.

15. The system of claim 11, wherein at least part of the account authorization code is one of a color sequence, an alphanumeric sequence, or a keyword.

16. A system, comprising:
a first computing device comprising a processor and a memory, the first computing device being associated with a supervising account; and
an application comprising machine-readable instructions stored in the memory of the first computing device that, when executed by the processor of the first computing device, cause the first computing to at least:
receive a transaction verification request from a second computing device, the transaction verification request being received by the second computing device from a third computing device associated with a supervised user;
receive a message from the second computing device, the message indicating at least one of an item requested, a cost of the item, or an identify of a supervised user entering the transaction request;
display a transaction approval request corresponding to the transaction verification request;
determine that a transaction verification apparatus is connected to the first computing device;
determine that a first housing portion of a transaction verification apparatus and a second housing portion of the transaction verification apparatus are connected to one another, the first housing portion of the transaction verification apparatus and the second housing portion of the transaction verification apparatus being connected to one another when a circuit between a first memory located in the first housing portion and a second memory located in the second housing portion is completed;
obtain a first portion of an electronic key authorization (EKA) code from the first memory located in the first housing portion of the transaction verification apparatus and a second portion of the EKA code from the second memory located in the second housing portion of the transaction verification apparatus in response to determining that the transaction verification apparatus is connected to the first computing device and that the first housing portion and the second housing portion of the transaction verification apparatus are connected to one another; and
send the EKA code to the second computing device.

17. The system of claim 16 wherein:
the application is a first application;
the processor is a first processor;
the memory is a first memory;
the second computing device comprises a second processor and a second memory; and
a second application comprising machine-readable instructions stored in the second memory of the second computing device, when executed by the second processor of the second computing device, causes the second computing device to at least:
determine that the EKA code received from the second computing device matches an account authorization code associated with the supervising account, a match between the EKA code and the account authorization code authorizing a transaction request received by the second computing device.

18. The system of claim 17, wherein the second computing device further comprises machine-readable instructions that cause the second computing device to at least obtain data indicative of a user account based at least in part on information in the transaction verification request.

19. The system of claim 17, wherein second computing device further comprises machine-readable instructions that cause the second computing device to at least send the message to the first computing device based at least in part on at least one of a dollar amount of a transaction, an identity of the supervised user associated with the third computing device, and at least one user setting.

20. The system of claim 19, wherein at least part of the account authorization code is one of a color sequence, an alphanumeric sequence, or a keyword.

* * * * *